(12) United States Patent
Kawaguchi et al.

(10) Patent No.: US 7,702,852 B2
(45) Date of Patent: Apr. 20, 2010

(54) STORAGE SYSTEM FOR SUPPRESSING FAILURES OF STORAGE MEDIA GROUP

(75) Inventors: Tomohiro Kawaguchi, Yokohama (JP); Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 11/540,531

(22) Filed: Oct. 2, 2006

(65) Prior Publication Data
US 2008/0034156 A1 Feb. 7, 2008

(30) Foreign Application Priority Data
Aug. 4, 2006 (JP) ............................. 2006-212925

(51) Int. Cl.
*G06F 12/16* (2006.01)
(52) U.S. Cl. ................ 711/114; 711/162; 711/E12.103
(58) Field of Classification Search ........................ None
See application file for complete search history.

(56) References Cited
U.S. PATENT DOCUMENTS
7,047,354 B2  5/2006  Yagisawa et al.
7,380,064 B2 *  5/2008  Murotani et al. ............. 711/133
2004/0162940 A1 *  8/2004  Yagisawa et al. ............ 711/114

FOREIGN PATENT DOCUMENTS
JP        2004-246749        9/2004

* cited by examiner

*Primary Examiner*—Denise Tran
(74) *Attorney, Agent, or Firm*—Antonelli, Terry, Stout, & Kraus, LLP.

(57) ABSTRACT

A consumption value of each storage medium and an upper limit related to writing are managed. Respective consumption value and the upper limit of each of two or more storage media out of a plurality of storage media constituting a storage media group are specified, and a remaining use period value is computed for each of the storage media using the upper limit and the consumption value. Based on each of the computed remaining use period values, data in at least one storage medium out of a plurality of storage media belonging to the selected storage area group is shifted to a storage medium which is different form the storage area group.

8 Claims, 21 Drawing Sheets

FIG. 7

| MEDIUM NUMBER | WRITE COUNT | PARITY GROUP NUMBER | MEDIUM TYPE |
|---|---|---|---|
| 0 | 3792 | 1 | 512 MB MADE BY COMPANY A |
| 1 | 3792 | 1 | 512 MB MADE BY COMPANY A |
| 2 | 5529 | 1 | 512 MB MADE BY COMPANY A |
| 3 | 5529 | 1 | 512 MB MADE BY COMPANY A |
| 4 | 4629 | 2 | 128 MB MADE BY COMPANY B |
| 5 | 4876 | 2 | 128 MB MADE BY COMPANY B |
| 6 | 4702 | 2 | 128 MB MADE BY COMPANY B |
| 7 | 4951 | 2 | 128 MB MADE BY COMPANY B |
| 8 | 0 | RESERVED | 512 MB MADE BY COMPANY C |
| 9 | 8976 | RESERVED | 128 MB MADE BY COMPANY C |

FIG. 8

| MEDIUM TYPE | WRITE COUNT UPPER LIMIT | ERASE SIZE | TRANSFER PERFORMANCE |
|---|---|---|---|
| 128 MB MADE BY COMPANY A | 2000 | 4kB | 10MB/s |
| 512 MB MADE BY COMPANY A | 8000 | 4kB | 10MB/s |
| 128 MB MADE BY COMPANY B | 1500 | 8kB | 20MB/s |
| 256 MB MADE BY COMPANY B | 3000 | 8kB | 20MB/s |
| 512 MB MADE BY COMPANY B | 5000 | 8kB | 20MB/s |
| 1 GB MADE BY COMPANY B | 5000 | 16kB | 40MB/s |
| 128 MB MADE BY COMPANY C | 6000 | 2kB | 20MB/s |
| 256 MB MADE BY COMPANY C | 7000 | 4kB | 40MB/s |
| 512 MB MADE BY COMPANY C | 8000 | 8kB | 80MB/s |

FIG. 9

| TABLE NUMBER | VOLUME NUMBER | LBA | NEXT POINTER |
|---|---|---|---|
| 0 | 2 | 0x002048FA00 | 1 |
| 1 | 1 | 0x164F7E000 | 2 |
| 2 | 1 | 0x00439700 | 3 |
| 3 | 0 | 0x20000000 | NULL |
| 4 | 2 | 0x2068C500 | 5 |
| 5 | 1 | 0x11111100 | 6 |
| 6 | 1 | 0x5D44FF00 | NULL |
| 7 | NULL | NULL | 8 |
| 8 | NULL | NULL | NULL |

1135-1a, 1135-1b, 1135-1c, 1135-1d → 1135-1

| KEY TYPE | FIRST POINTER |
|---|---|
| FREE | 0 |
| CLEAN | 7 |
| DIRTY | 4 |

1135-2a, 1135-2b → 1135-2

1135

| VOLUME NUMBER | PARITY GROUP NUMBER | APPLICATION | CAPACITY |
|---|---|---|---|
| 0 | 1 | ARCHIVE | 100GB |
| 1 | 1 | OPERATION | 200GB |
| 2 | 1 | BACKUP | 200GB |
| 3 | 2 | WORM | 100GB |
| 4 | 2 | ARCHIVE | 100GB |
| 5 | 2 | OPERATION | 100GB |
| 6 | 2 | OPERATION | 200GB |
| 7 | 3 | UNUSED | 100GB |
| 8 | 3 | UNUSED | 100GB |
| 9 | 4 | UNUSED | 200GB |
| 10 | 4 | UNUSED | 200GB |

| APPLICATION | REQUIRED PERFORMANCE | REQUIRED WRITE FREQUENCY |
|---|---|---|
| ARCHIVE | 10MB/s | 0 TIMES/s |
| WORM | 20MB/s | 0 TIMES/s |
| BACKUP | 20MB/s | 10 TIMES/s |
| OPERATION | 40MB/s | 2000 TIMES/s |

| PARITY GROUP NUMBER | CAPACITY [GB] | MAXIMUM PERFORMANCE | RESIDUAL LIFE FOR WRITING |
|---|---|---|---|
| 0 | 100,200,200,400 | 400MB/s | 20000 TIMES |
| 1 | 200,200,200,200 | 200MB/s | 60000 TIMES |
| 2 | 300 | 100MB/s | 0 TIMES |
| 3 | 400,200 | 150MB/s | 300000 TIMES |
| 4 | 100,100,100,100 | 100MB/s | INFINITE |
| 5 | 300,300,100 | 100MB/s | 0 TIMES |

4022a, 4022b, 4022c, 4022d → 4022

STORAGE SYSTEM FOR SUPPRESSING FAILURES OF STORAGE MEDIA GROUP

CROSS-REFERENCE TO PRIOR APPLICATION

This application relates to and claims priority from Japanese Patent Application No. 2006-212925, filed on Aug. 4, 2006, the entire disclosure of which is incorporated herein by reference.

BACKGROUND

1. Field of the Invention

The present invention relates to a storage system having a plurality of storage media.

2. Description of the Related Art

In a conventional storage system, a plurality of storage media are integrated, and high performance, based on parallel access, and high availability by data redundancy, are implemented using a configuration called a RAID (Redundant Array of Inexpensive Disks).

For this storage system, a storage medium called HDD (Hard Disk Drive) is normally used. An HDD is comprised of a disk called a platter where a magnetic substance for recording data is coated or deposited, a magnetic head for reading or changing the magnetic status of the platter, and a motor for rotating the platter so as to move the magnetic head onto a specified position on the platter.

Characteristics of an HDD are that access performance to the data is high, capacity is large, and cost per unit capacity is low.

In an HDD, magnetic force to handle information per unit capacity decreases naturally as the magnetic information is recorded in a micro area because of the increase of capacity. In order to detect this weakened magnetic force, the space between the platter and the magnet head must be small. This space has now reached the nanometer level.

Therefore the magnetic head may contact the rotating platter by vibration, and the platter may fail because of this contact.

Also the motor for rotating the platter is a mechanical drive component, and wears out after long periods of operation, which leads to HDD failure.

Therefore the life of an HDD is predominantly determined by the operating time.

In a storage system using an HDD, the operating time of the HDD in the storage system is recorded, and by replacing the HDD operating for a long time with a spare HDD, for example, failures are prevented so as not to lose data, and to implement high availability as shown in the method disclosed in Document 1 (Japanese Patent Application Laid-Open No. 2004-246749).

SUMMARY OF THE INVENTION

There is a storage medium called a flash memory medium which uses a flash memory. A flash memory is a semiconductor device where data loss is not generated even if the supply of power is stopped, and data can be freely erased and written. Recently a flash memory medium using a semiconductor device called a "NAND type flash memory" in particular, is becoming popular, since its capacity is increasing and the price per unit capacity is decreasing.

Unlike an HDD, a flash memory medium does not have mechanical drive components, so the deterioration of this storage medium is low even after a long period of operation. Also the time to move the magnetic head by the rotation of the platter is not required, so the overhead time required for data retrieval can be decreased, and the response performance can be improved compared with an HDD.

Therefore the development of a storage system which uses a flash memory medium instead of an HDD is under consideration.

However it must be noted that a flash memory, which is a data storage component of a flash memory medium, deteriorates by writing.

This is because in the case of a flash memory, data is stored in a unit called a "memory cell", and is managed by a unit of a block which is a set of a plurality of memory cells, and data is stored in an area assigned to appropriate memory cells when data is written, and data cannot be overwritten directly to memory cells where data is already stored. Therefore if data is written to memory cells where data is already written, erase processing is required by filling electrons into a block once to erase the current data. In this erase processing, high voltage is applied to a block, so the oxide film constituting the flash memory deteriorates, and this leads to the deterioration of the flash memory.

It is generally said that a block is erased about 100,000 times, after which the block reaches its end of life.

In order to prevent failure of a storage media by such deterioration, a method of preventing local deterioration by evenly distributing the write amount on an entire flash memory, or a method of preparing an alternate block in case of failure generated in a specific area (hereafter called "flash memory deterioration suppression method") is used.

However, the flash memory deterioration suppression method is a method that is effective only within a flash memory medium, and if a flash memory medium is applied to a storage system, another problem may occur.

The problem is that in a storage system, the number of times of writing to a storage media constituting a RAID group may be equalized, so it is highly possible that the flash memory media constituting a same RAID group may fail at around the same time.

Basically a storage system provides a logical data storage device called a "volume" to an information equipment (e.g. host computer) which uses this storage system. The physical configuration of a volume is transparent to an information equipment which uses this volume and the application which runs on this information equipment. Therefore the information equipment and application cannot be used according to the characteristics of the storage media constituting this volume. And as a result it is difficult to avoid this problem by control from the information equipment or the application.

Particularly in the case of a redundant configuration called the "mirroring" of RAID 1, where identical data is stored in two storage media, if one storage media fails then data is maintained using the other storage medium, but if both of the storage media are written for a same number of times, failure tends to occur to the mirrored storage media at around the same time, and therefore the danger of data loss is high.

This problem is not limited to the case of using a flash memory medium as the storage medium to be installed in a storage system, but can occur in the same way in the case of other storage media which could deteriorate by writing.

With the foregoing in view, it is an object of the present invention to improve the availability of a storage system where a plurality of storage media, which deteriorate by writing, are installed.

A storage system according to the present invention comprises a control section for processing a read/write request from an external device outside the storage system, a plurality of storage media for storing data to be used by the external device, group management information that indicates the correspondence between each of the plurality of storage media and each of the plurality of storage media groups formed of a plurality of storage media, storage media management information for managing a consumption value related to writing for each of the plurality of storage media, and upper limit write management information for managing information that indicates an upper limit related to writing of each of the plurality of storage media. The control section updates a consumption value in the storage media management information corresponding to a storage medium of a write destination according to writing to a storage medium, and selects a storage media group out of the plurality of storage media groups. The control section also specifies a plurality of storage media constituting the selected storage media group out of the group management information, and acquires a consumption value from the storage media management information for each of the specified plurality of storage media. The control section also acquires an upper limit related to writing from the storage media management information for each of the specified plurality of storage media, and computes a remaining use period value, which indicates how much longer the storage media can be used, using the acquired consumption value and the acquired upper limit. And the control section shifts data in at least one storage medium out of the plurality of storage media belonging to the selected storage area group to a storage medium which is different from the storage area group, based on each of the computed remaining use period values.

Here the remaining use period value can be any value which indicates how much longer the storage media can be used. For example, this value may be a value to indicate a period that the storage medium can be used, or a value to indicate the number of times that data can be written.

In the first aspect, the consumption value is at least one of a write count, erase count and defective area size.

In the second aspect, the storage system further comprises one or more reserved storage media which do not belong to any of the plurality of storage media groups. The control section computes a difference of the remaining use period values of two storage media out of the specified plurality of storage media, and compares the difference with a first threshold value. The control section shifts data in a first storage medium out of the first and second storage media corresponding to the two storage media respectively to one reserved storage medium out of one or more reserved storage media if the difference is less than the first threshold value.

The third aspect is the above mentioned second aspect, wherein the two storage media are a storage medium of which remaining use period value is shortest and a storage media of which remaining use period value is second shortest.

The fourth aspect is the above mentioned second aspect, wherein the first threshold value is a value which makes a second time length from the failure of the storage medium of which remaining use period value is shorter out of the two storage media up to the completion of the data shift to the reserved storage medium to be shorter than a first time length up to the failure of the storage medium of which remaining use period value is longer.

The fifth aspect is the above mentioned second aspect, wherein the storage media management information includes the consumption value of each of the reserved storage medium. The control section computes the remaining use period value of each of the reserved storage media using the consumption value and the upper limit of each of the reserved storage media, and shifts the data in the first storage medium to a reserved medium having a remaining use period value of which difference from the remaining use period value of the second storage medium is the first threshold value or more.

The sixth aspect is the above mentioned second aspect, wherein the control section changes the first threshold value according to the write frequency to the storage media group and/or each storage medium.

In the seventh aspect, the group management information includes a RAID configuration of each storage media group. The control section specifies the RAID configuration of the selected storage media group from the group management information, and selects a storage medium to be a target of computing a remaining use period value from the plurality of storage media constituting the storage media group based on the specified RAID configuration.

The eighth aspect is the above mentioned second aspect, wherein the two storage media are storage media of which remaining use period values are close to each other.

The ninth aspect further comprises a cache memory area for temporarily storing write target data from an external device. The control section stores a plurality of write target data which are stored in the cache memory area and which do not match the data in each of the storage media in a predetermined sequence respectively. The control section compares the computed remaining use period value and the second threshold value for a write destination storage media of a certain write target data out of the plurality of write target data, and moves the sequence of certain write target data to be later than the sequence if the remaining use period value is less than the second threshold value.

The tenth aspect is the above mentioned ninth aspect, wherein the control section compares the total volume of the plurality of write target data and a third threshold value, and moves the sequence of the write target data to be later than the sequence if the remaining use period value is less than the second threshold value, and the total volume is less than the third threshold value.

In the eleventh aspect, the control section compares the computed remaining use period value of the write destination storage medium of the data and a fourth threshold value, and temporarily stops writing if the remaining use period value is less than the fourth threshold value.

In the twelfth aspect, one or a plurality of logical volumes are provided in each of the plurality of storage media groups. The storage system further comprises volume management information that indicates in which storage media group each logical volume exists, and what kind of application each logical volume is used for, and policy information that indicates a consumption value change degree according to each application. The control section specifies one or more logical volumes in the selected storage media group and the respective application of the one or more logical volumes from the volume management information. The control section specifies each consumption value change degree corresponding to each of the specified applications from the policy information. The control section computes a remaining use period value of a group that indicates how much longer the storage media group can be used, using the remaining use period value and the consumption value change degree for each of the plurality of storage media constituting the selected storage media group. The control section compares the remaining use period value of the group and a fifth threshold value, and executes data shift processing to shift the data in one logical volume out of the selected storage media group to a logical volume different from the selected storage media group if the remaining use period value of the group is less than the fifth threshold value.

The thirteenth aspect is the above mentioned twelfth aspect, wherein the consumption value change degree is a consumption value per unit time. The control section computes the total of the remaining use period values of a plurality of storage media constituting the selected storage media group, and the total of the plurality of consumption value change degrees respectively, and computes the remaining use period value of the group using the total of the remaining use period values and the total of the consumption value change degrees.

The fourteenth aspect is the above mentioned twelfth aspect, wherein the control section decides whether the data shift processing is performed based on at least one of performance required for each application, reliability of each storage medium, and price of each storage medium.

The fifteenth aspect is the above mentioned fourteenth aspect, wherein the performance is the data transfer speed per unit time. The group management information includes group performance, which is the performance of the storage media group, for each storage media group. The policy information includes each performance required for each application. The control section compares a total value of the performance of all the logical volumes of the selected storage media group and the group performance of the selected storage media group, and executes the data shift processing if the total value exceeds the group performance.

The storage system can comprise a control section for processing a read/write request from an external device outside the storage system, a plurality of storage media for storing data used by the external device, group management information that indicates the correspondence between each of the plurality of storage media and each of a plurality of storage media groups formed of a plurality of storage media, and storage media management information for managing the remaining use period information on the remaining use period value of each of the plurality of storage media. The control section can update the remaining use period information in the storage management information corresponding to the write destination storage media according to the writing to the storage media. The control section can select one storage media group out of the plurality of storage media groups, and specify a plurality of storage media constituting the selected storage media group from the group management information. The control section can acquire the respective remaining use period information of the specified plurality of storage media from the storage media management information, and shift data in at least one storage medium out of the plurality of storage media belonging to the selected storage area group to a storage medium which is different from the storage area group based on each of the remaining use period values specified from each remaining use period information. The remaining use period value here may be the above mentioned consumption value itself.

One or more processings out of the plurality of processings of the control section of the storage system may be executed by a device outside the storage system (e.g. computer).

The above mentioned various information can be stored in each storage area, and each storage area can be constructed by such a storage resource as a memory. The processing executed by the control section can be executed by hardware, control program or combination thereof (for example a part of the processing is implemented by a computer program, and the rest is implemented by hardware). Specifically, the control section, for example, can be implemented by one or a plurality of circuit boards (e.g. circuit boards on which a CPU and memories are mounted). The computer program is read and executed by a predetermined processor. When information processing is executed by a processor which reads a computer program, storage area existing on a hardware resource, such as a memory, may be used. The computer program may be installed from such a recording medium as a CD-ROM to the computer, or may be downloaded to the computer via a communication network.

BRIEF DESCRIPTION OF THE DRAWINGS

FIG. 7 is a table showing a detailed configuration of the media management table 1133;

FIG. 8 is a table showing a detailed configuration of the media information data base 1134;

FIG. 9 is a table showing a detailed configuration of the cache memory control table 1135;

FIG. 21 is a table showing a detailed configuration of the policy management data base 4021;

FIG. 22 is a table showing a detailed configuration of the parity group information data base 4022.

DESCRIPTION OF THE PREFERRED EMBODIMENTS

Embodiments of the present invention will now be described with reference to the drawings. The present invention, however shall not be limited to the embodiments to be described herein below.

Embodiment 1

Figure 1:
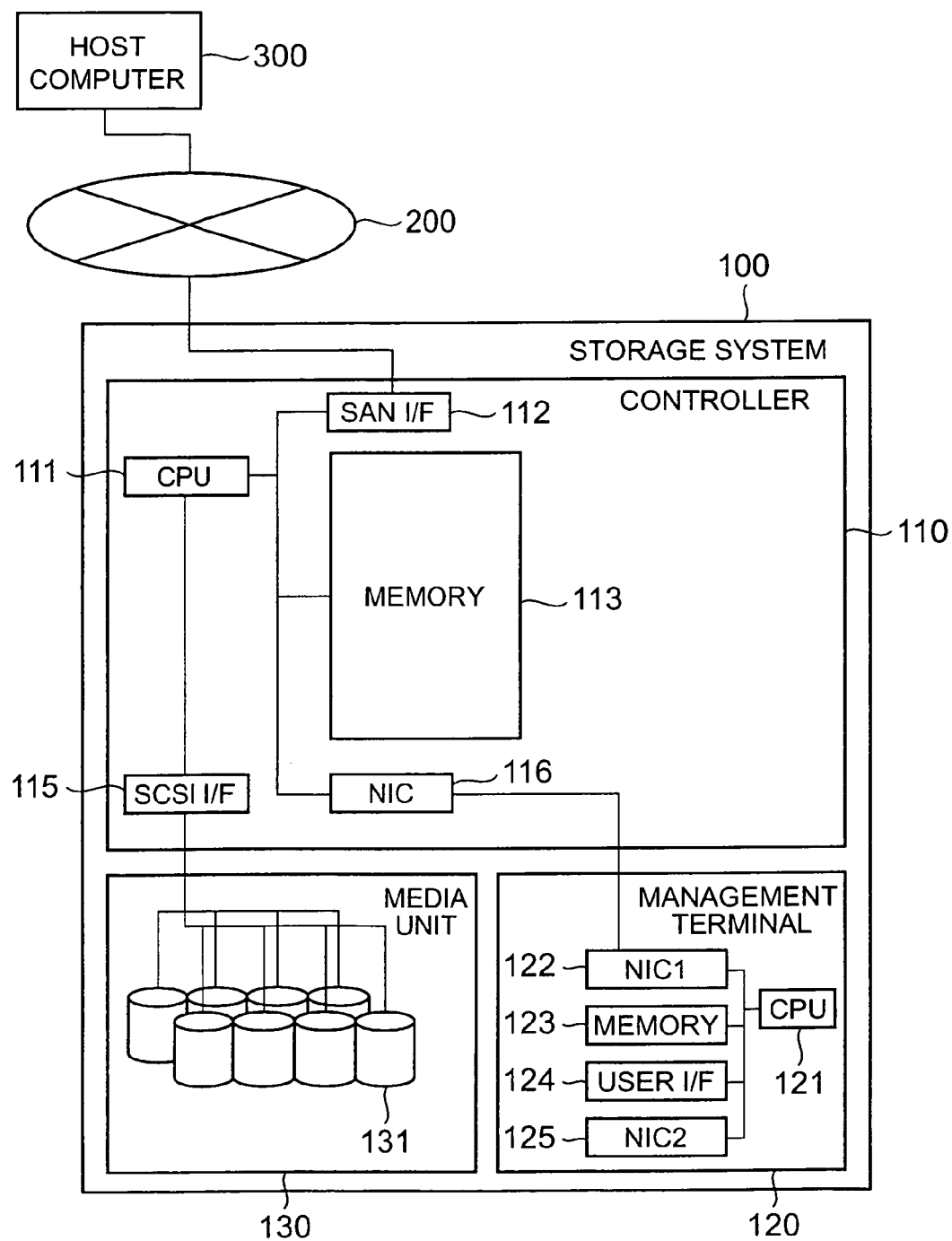
FIG. 1 is a diagram depicting a configuration example of a computer system according to the first embodiment of the present invention.

FIG. 1 is a diagram depicting the configuration example of the computer system according to the first embodiment of the present invention. In this embodiment, the storage system corresponds to the above mentioned storage system.

The configuration of the computer system will be described first.

A storage system 100 and a host computer 300 are connected to a storage network 200. A write request for writing data and a read request for reading data can be sent from the host computer 300 to the storage system 100.

The storage system 100 is comprised of a media unit 130 for storing a plurality of flash memory media 131, a controller 110 for controlling each flash memory medium 131, and a management terminal 120 for managing this storage system 100. In the following description, a flash memory medium may simply be called a "medium".

The controller 110 is comprised of a processor 111 for controlling this controller 110 entirely, a memory 113 for storing computer programs and control information for controlling by the processor 111, a storage network interface 112 which is an interface for connecting a storage network 200, a media interface 115 which is a communication interface with the flash memory medium 131, and a network interface 116 which is a communication interface with the management terminal 120.

The management terminal 120 is comprised of a processor 121 for control of the management terminal 120 entirely, a memory 123 for storing computer programs and control information for the processor 121 performing control, a network interface 122 which is an interface for mutually communicating with the network interface 116, a user interface 124 which is an interface for the user to manage this equipment, and a network interface 125 which is an interface for communicating with external equipment.

As an example of the components shown in FIG. 1, the following equipment can be used.

The host computer 300 is a computer for performing operation, such as a mainframe and various type of servers, and the OS (Operating System) running on this equipment. For the OS, z/OS, Linux®, UNIX®, Windows® and various other OSs can be used.

For the cables constituting the storage network 200, fibre channel cable and Ethernet cable, for example, can be used.

The processor 111 is a CPU, for example.

For the memory 113, a volatile memory, such as SRAM and SDRAM, or a non-volatile memory, such as flash memory, can be used.

The storage network interface 112 is a connector to which a cable to be used for the storage network 200 is connected. A connector similar to this is also installed in the host computer 300, although it is not illustrated. If the storage network 200 is fibre channel cable, and the host computer 300 is a mainframe, FICON (Fibre Connection)®, for example, is used. If the storage network 200 is Ethernet cable and the host computer 300 is such an open system server running UNIX® and Windows®, iSCSI, for example, is used. ESCON (Enterprise Systems Connection)® or an FC (Fibre Channel) connector, for example, may also be used.

The processor 121 is a CPU, for example.

For the memory 123, a volatile memory, such as SRAM and SDRAM, or a non-volatile memory, such as flash memory, can be used.

The user interface 124 is a device which can input or output for the user, such as a display, mouse, keyboard and touch panel. On the display, GUI (Graphical User Interface) or CUI (Command Line User Interface) images are displayed.

The network interfaces 116, 122 and 125 are communication interfaces that use an Ethernet card, for example.

The flash memory medium 131 is a medium having the characteristic of storing data in a flash memory, and deteriorates by write processing, so the possibility of failure increases as the number of times of writing increases.

Figure 2:
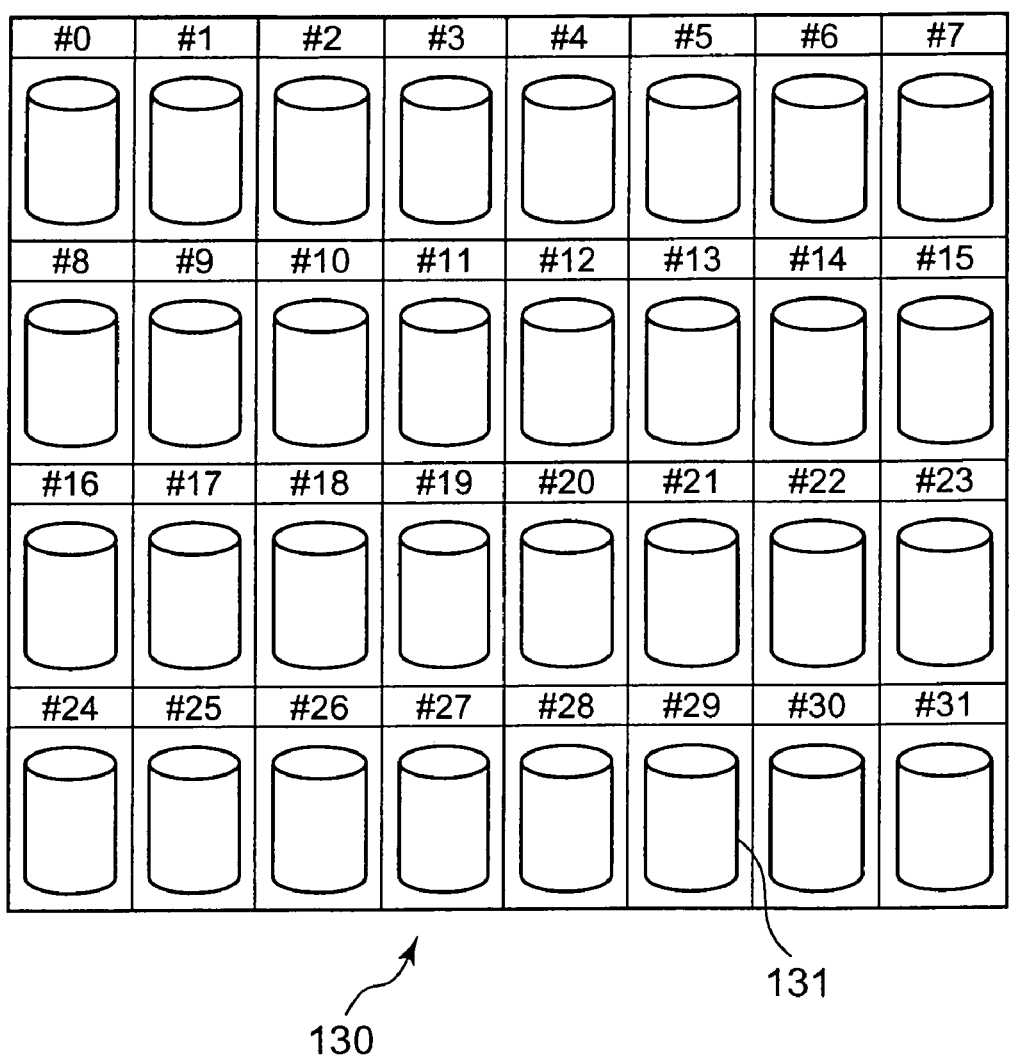
FIG. 2 is a diagram depicting a structure of the media unit.

FIG. 2 is a diagram depicting the structure of the media unit 130.

As FIG. 2 shows, in the media unit 130, a shelf for storing a flash memory medium 131 is created for each flash memory medium 131. To an individual medium 131, a shelf and corresponding medium number are assigned. The medium number has a unique value in the storage system 100.

In the media unit 130, a storage medium other than flash memory 131, such as a magnetic storage device including HDD, may also be installed.

Figure 3:
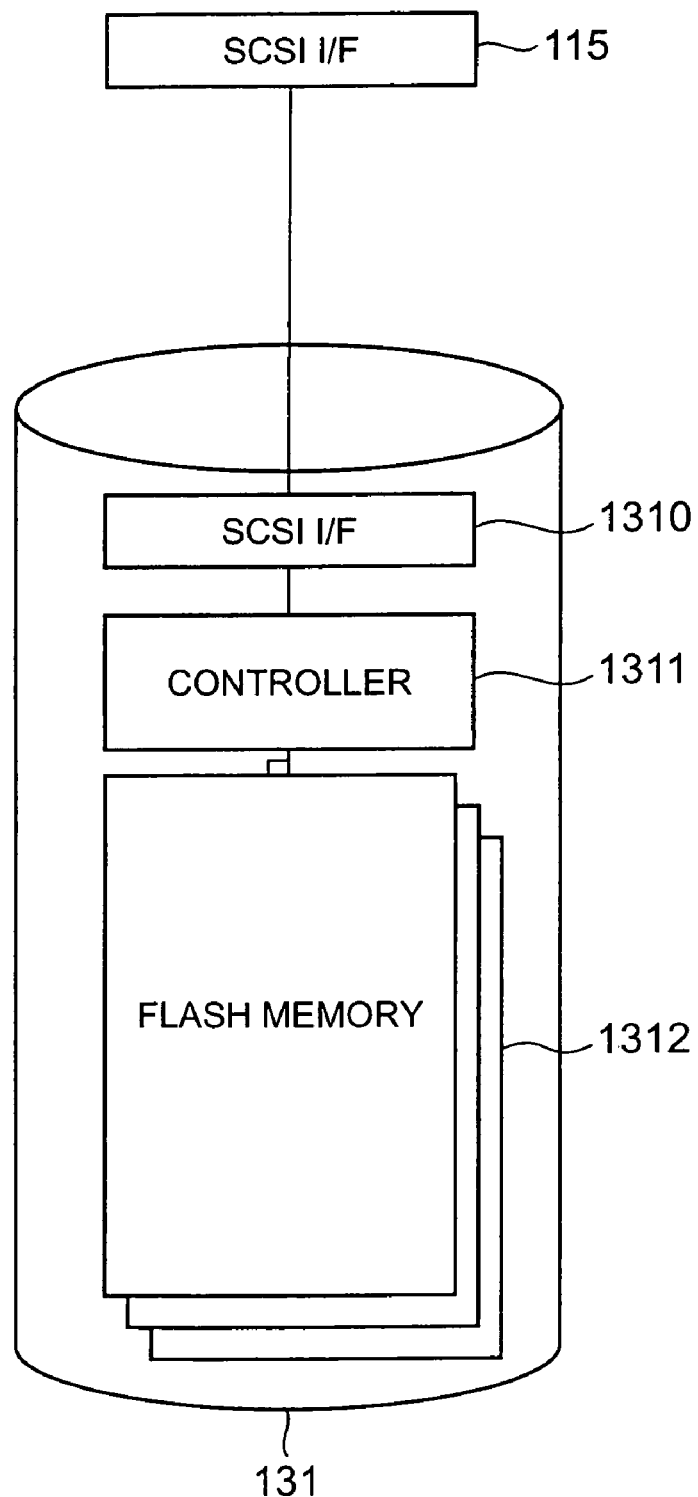
FIG. 3 is a diagram depicting a detailed structure of a flash memory medium.

FIG. 3 is a diagram depicting a detailed structure of the flash memory medium 131.

The flash memory medium 131 is comprised of a media interface 1310 which is a communication interface with the media interface 115 shown in FIG. 1, a flash memory 1312 for storing data, and a media controller 1311 for controlling reading/writing of data for the flash memory 1312 according to I/O (Input/Output) received by the media interface 1310.

The media controller 1311 here may have not only a data access control function but also a function to prevent the generation of failure by equalizing the write count for the entire flash memory, or a function to assign an alternate area, which has been secured in advance, for replacing the locally generated defective area. In the case of the media controller 1311 having the function of assigning an alternate area, the media controller 1311 may have a function to acquire an unused amount of the alternate area, notifying this to the controller 110 via the media interface 1310.

Figure 4:
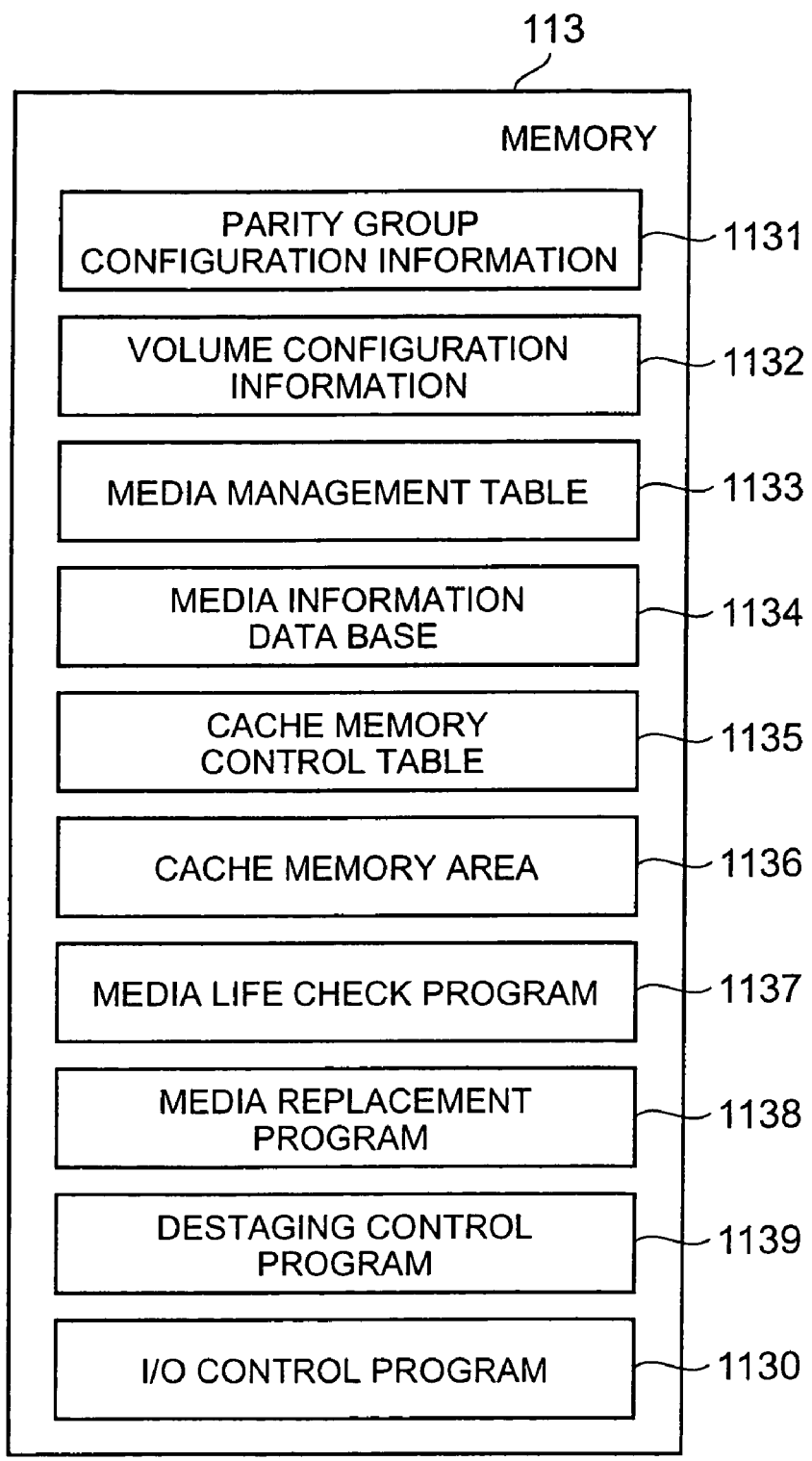
FIG. 4 is a diagram depicting a detailed configuration of the programs and control information stored in the memory 113.

FIG. 4 is a diagram depicting a detailed structure of the programs and control information stored in the memory 113.

In the memory 113, a cache memory area 1136 is created. The cache memory area 1136 is an area for temporarily storing data in the memory 113 in order to access I/O faster, or to make storing data to the flash memory medium 131 faster.

In the memory 113, parity group configuration information 1131, volume configuration information 1132, media management table 1133, media information data base 1134 and cache memory control table 1135, for example, are stored as the control information. The parity group configuration information 1131 is a table for managing the configuration of the flash memory media 131 included in the parity group. A parity group is a plurality of flash memory media 131 which become a unit of data storage and redundancy in the RAID configuration. The parity group in this case is not limited to a redundant configuration using parities, like the case of RAID 5, but may be a mirroring which does not use parities, for example. Therefore a parity group may be referred to as a redundancy configuration group. The volume configuration information 1132 is a table for managing the configuration of a logical volume (hereafter may be simply called a "volume"). The volume is a logical storage device created by dividing the parity group into arbitrary sizes. The media management table 1133 is a table for storing information on each of the plurality of flash memory media 131. The media information data base 1134 is a data base for storing the characteristic information of various media to be used for computing the residual life of the flash memory media 131. The cache memory control table 1135 is a table for managing data of the cache memory area 1136.

Also in the memory 113, a medium life check program 1137 for checking the residual life of each flash memory medium, a medium replacement program 1138, wherein after copying the data stored in a specified flash memory medium 131 to another flash memory medium 131, the configuration of the parity group to which these flash memory media 131 belong is changed, are stored as programs to be executed by the processor 111. Also a destaging control program 1139 for writing data which is stored in the cache memory area 1136 and is not reflected in the flash memory medium 131 according to the I/O characteristics and device configuration, and the I/O control program 1130 for controlling the I/O according to the I/O characteristics and the device use status, are stored.

Figure 5:
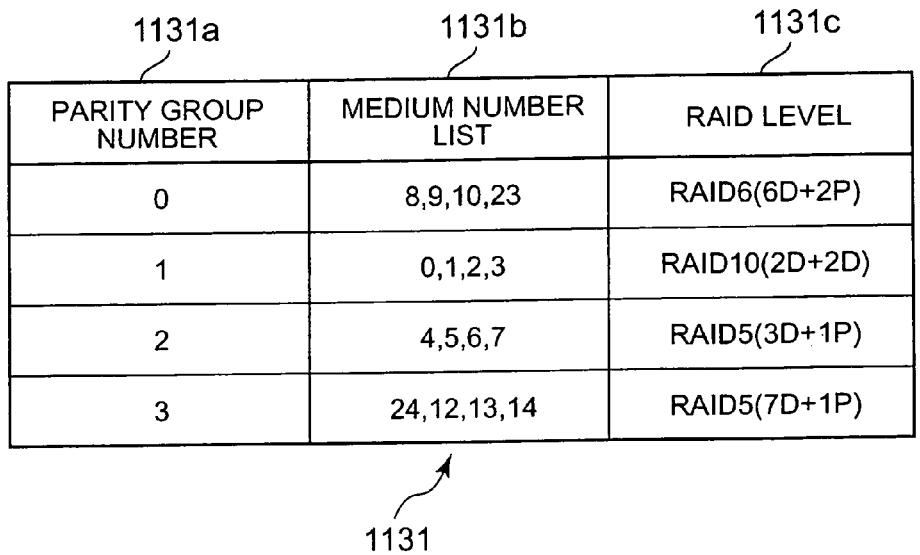
FIG. 5 is a table showing a detailed configuration of the parity group configuration information 1131.

FIG. 5 is a table showing a detailed configuration of the parity group configuration information 1131.

The parity group configuration information 1131 has parity number information 1131a, medium number list information 1131b, and RAID level information 1131c as composing elements. The parity number information 1131a includes a unique number (parity group number) of each parity group. In the medium number list information 1131b, a list of unique numbers (medium numbers) of a plurality of flash memory media constituting a parity group is included for each group. In the RAID level information 1131c, information to indicate the RAID level and the configuration of each parity group is included.

Here each parity group number in the parity number information 1131a is used as a table index when the later mentioned parity group number information 1132b in FIG. 6 and the parity group number information 1133c in FIG. 7 are referred to.

Each media number, which is a composing element of the media number list information 1131b, is used to acquire information related to the media number when the later mentioned media number information 1133a in FIG. 7 is referred to.

Figure 6:
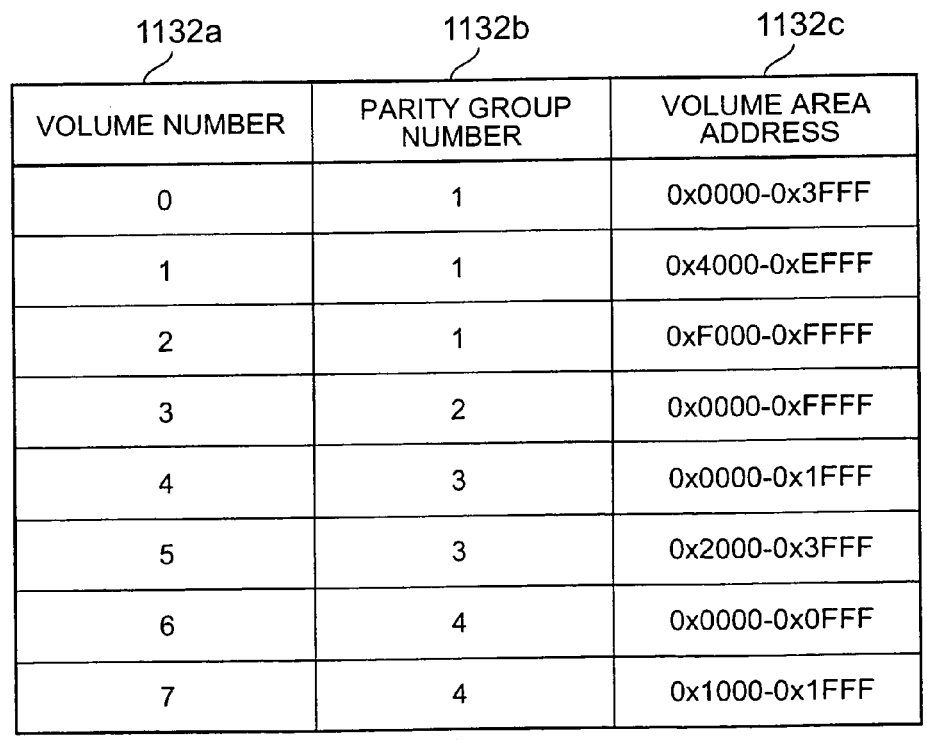
FIG. 6 is a table showing a detailed configuration of the volume configuration information 1132.

FIG. 6 is a table showing the detailed configuration of the volume configuration information 1132.

The volume configuration information 1132 has volume number information 1132a, parity group number information 1132b and volume area address information 1132c as composing elements. The volume number information 1132a includes unique volume numbers in the storage system 100. In the parity group number information 1132b, the number of the parity group to which the volume belongs is included for each volume. In the volume area address information 1132c, information (address) to indicate the area which the volume is using in the parity group is included for each volume.

Here each parity group number in the parity group number information 1132b corresponds to the parity group number in the above mentioned parity number information 1131a (FIG. 5). By using the parity group number in the parity group number information 1132b, the information corresponding to the parity group number based on the parity group configuration information 1131 can be acquired.

FIG. 7 is a table showing the detailed configuration of the media management table 1133.

The media management table 1133 has medium number information 1133a, write count information 1133b, parity group number information 1133c and medium type information 1133d, for example, as composing elements. In the medium number information 1133a, a medium number of each flash memory medium is included. In the write count information 1133b, a generated write count is included for each flash memory medium. In the parity group number information 1133c, the number of the parity group to which the flash memory medium belongs is included for each flash memory medium. If the medium is not used but is reserved at the moment, "reserved" is recorded as the value of the parity group number. In the medium type information 1133d, information on the type of flash memory medium (hereafter called medium type) is included for each flash memory medium. In the medium type, a manufacturer name and storage capacity of the flash memory medium, for example, are included.

Here the medium number information 1133a indicates a table index which is referred to by the above mentioned medium number list information 1131b (see FIG. 5).

By using each parity group number in the parity group number information 1133c, information corresponding to the parity group can be acquired based on the parity group configuration information 1131.

Also by using each medium number in the medium type information 1133d, the information corresponding to the medium number can be acquired based on the media information data base 1134.

If the media controller 1311 has a function to acquire the defective area size generated in the flash memory 1312 and notify this information to the controller 110 via the media interface 1310, the defective area size, instead of the write count, may be stored in the write count information 1133b. In this case, the total defective area size upper limit value, instead of the write count upper limit value, may be used.

The residual life computation, which is described later, is implemented by determining a difference between the write count upper limit value in the write count upper limit value information 1134b described in FIG. 8 and the write count in the write count information 1133b, but this residual life value may be stored in a predetermined storage area (e.g. write count information 1133b) in advance.

The write count of each medium is updated when writing is performed to a given medium.

The erase processing count may be recorded instead of the write count. In this case, the erase processing count upper limit value may be used instead of the write count upper limit value.

FIG. 8 is a table showing a detailed configuration of the media information data base 1134.

The media information data base 1134 has medium type information 1134a, write count upper limit value information 1134b, erase size information 1134c and medium performance value 1134d, for example, as composing elements. In the medium type information 1134a, index information (type information) of various media is included. In the write count upper limit value information 1134b, an upper limit value of the write count is included for each type of medium. In the erase size information 1134c, the size of the area for erasing when the target media is written is included for each type of medium. In the media performance value 1134d, a performance value of the target media is included for each type of medium. This performance value is a data transfer speed, for example.

If the defective area size, instead of the write count, is included in the write count information 1133b (see FIG. 7), an allowable defective area size is included in the write count upper limit value information 1134b.

Here the medium type information 1134a is a table index which is referred to by the above mentioned medium type information 1133d in FIG. 7.

FIG. 9 is a table showing a detailed configuration of the cache memory control table 1135.

The cache memory control table 1135 is comprised of a cache memory information table 1135-1 and a cache memory queue header table 1135-2.

The cache memory information table 1135-1 has table number information 1135-1a, volume number information 1135-1b, LBA information 1135-1c and next pointer information 1135-1d, for example, as composing elements.

The table number information 1135-1a is an index number of the array of the cache memory information table 1135-1, and corresponds to a specific sub-area (called "cache memory slot") of the cache memory area 1136 one-to-one. In other words, the table number is also a cache memory slot number.

The volume number information 1135-1b indicates which logical volume the data stored in the cache memory slot indicated by the target table number (cache memory slot number) exists, and the LBA information 1135-1c indicates which position in the logical volume this data exists.

The next pointer information 1135-1d is information for implementing the queue structure of the cache memory information table 1135-1. A value (next pointer) is provided for each table number, and this value indicates the table number (cache memory slot number) which is referred to after the target table number. For example, according to FIG. 9, if the cache memory slot corresponding to the table number "0" is accessed, the required data can be acquired from the cache memory area 1136 by accessing the cache memory slots corresponding to the table numbers 1, 2 and 3 sequentially. The next pointer "NULL" means that there is no table number to be referred to next.

The cache memory queue header table 1135-2 is a header table of the queue management to indicate the state of the cache memory area 1136 corresponding to the cache memory information table 1135-1. In this table 1135-2, the queue type information 1135-2a to indicate the type of each queue which is linked in the cache memory information table 1135-1, and the first pointer information 1135-2b to indicate the first table number of each queue, are included.

There are three types of queue type information 1135-2a: "free", "clean" and "dirty". A queue which is linked to "free" indicates that the corresponding cache memory area 1136 is not used. Therefore this queue is called a "free queue". A queue which is linked to "clean" indicates that the data stored in the cache memory area 1136 and the data stored in the flash memory medium 131 indicated by the volume number information 1135-1b and the LBA information 1135-1c match. Therefore this queue is called a "clean queue". A queue which is linked to "dirty" indicates that the data stored in the cache memory area 1136 and the data stored in the flash memory medium 131 indicated by the volume number information 1135-1b and the LBA information 1135-1c do not match, and the data must be copied to the flash memory medium 131. Therefore this queue is called a "dirty queue".

Figure 10:
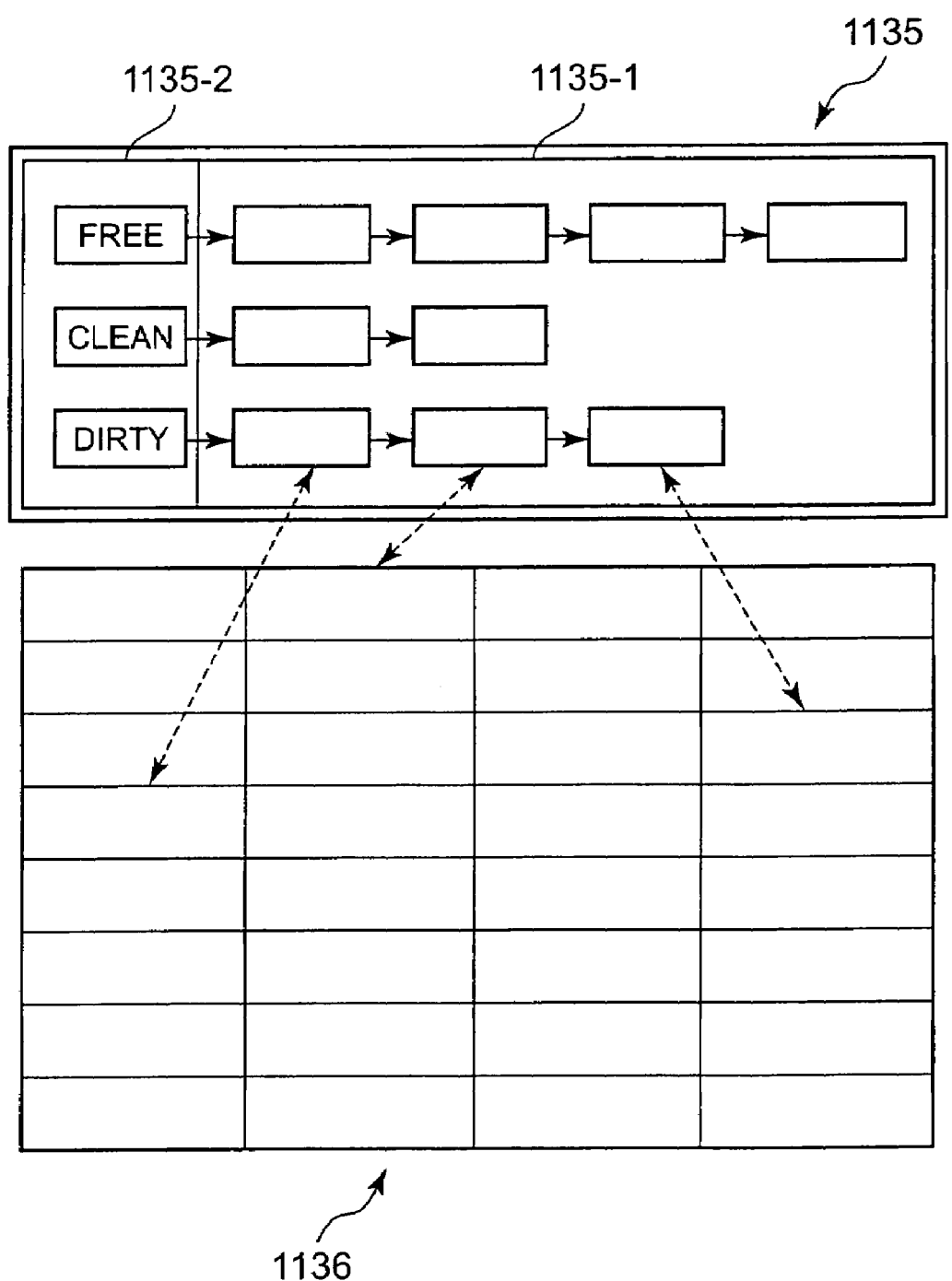
FIG. 10 is a diagram depicting the correspondence between the cache memory area 1136 and the cache memory control table 1135 shown in FIG. 9.

FIG. 10 is a diagram depicting the correspondence between the cache memory area 1136 and the cache memory control table 1135 shown in FIG. 9.

The cache memory area 1136 is divided into sections having a predetermined capacity, and stores data for each section. Each section and the cache memory information table information 1135-1 correspond to each other one-to-one.

Figure 11:
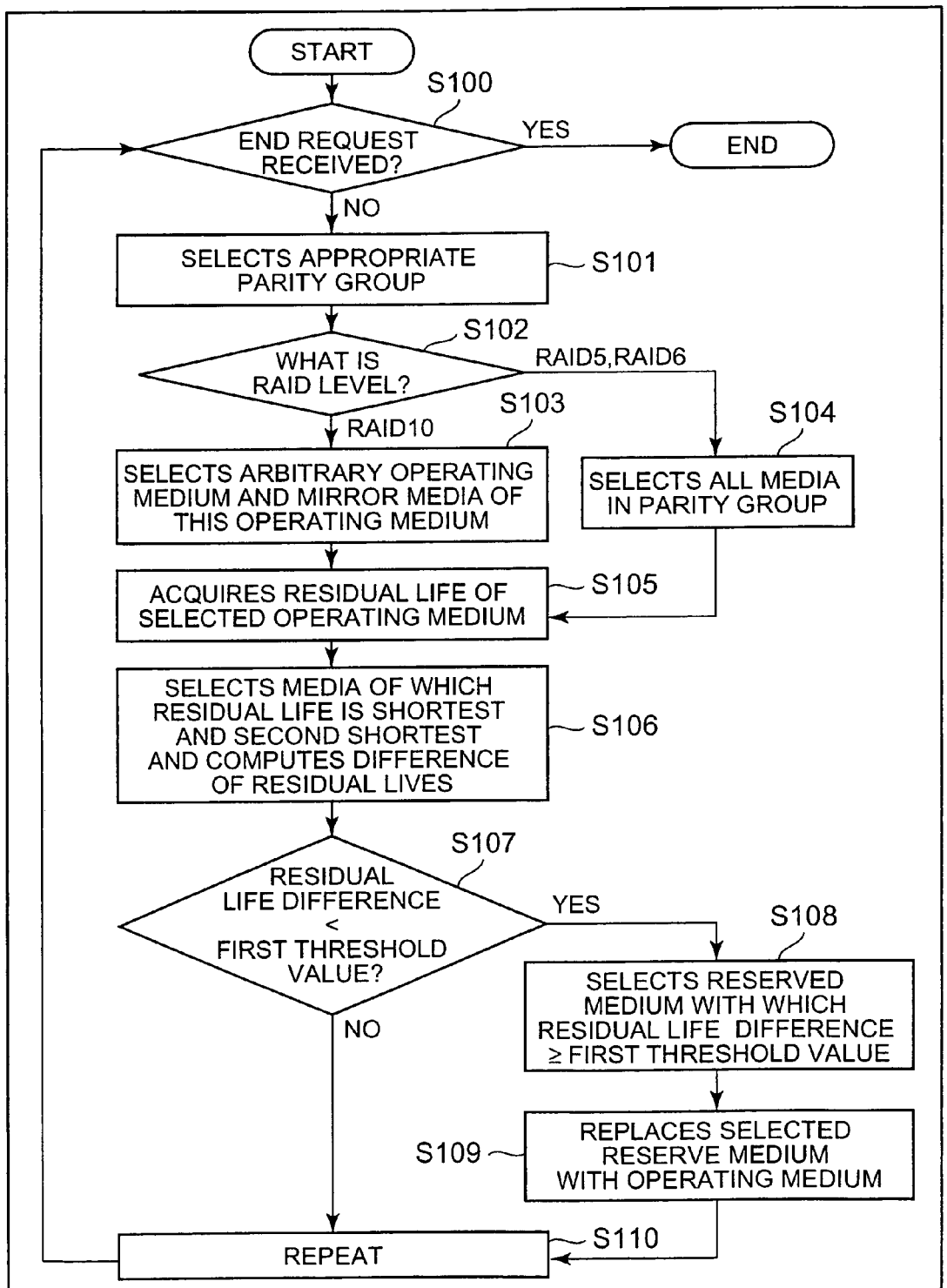
FIG. 11 is a flow chart depicting the processing procedure of the medium life check program 1137.

FIG. 11 is a flow chart depicting the processing procedure of the medium life check program 1137.

This program is executed by the processor 111 periodically, or according to an instruction from another program, or according to specification from the user. The processing procedure will now be described in detail. In the following description, if the subject of performing processing is a computer program, it is assumed that the processor which executes the computer program actually performs the processing.

The medium life check program 1137 checks whether the end request was received in step S100 after "Start". If the end request was received, this program ends. If the end request was not received, processing advances to step S101.

In step S101, the medium life check program 1137 selects an appropriate parity group managed by the storage subsystem 100. In this step S101, each of all the parity groups may be sequentially selected or selected at random. After selection, processing advances to step S102.

In step S102, the media life check program 1137 acquires the RAID level for the parity group selected in step S101. Specifically, the RAID level corresponding to the number of the selected parity group based on the parity group configuration information 1131 is acquired. If the acquired RAID level is "10" (mirroring+striping configuration), processing advances to step S103, and if the RAID level is "5" (parity configuration) or "6" (double parity configuration), processing advances to step S104.

In step S103, the medium life check program 1137 specifies a plurality of media corresponding to the parity group selected based on the parity group configuration information 1131 (specifically acquires a plurality of medium numbers corresponding to the number of selected parity group from the medium number list information 1131b), and selects a media pair which are mirrored out of the specified plurality of media, then processing advances to step S105.

In step S104, the medium life check program 1137 acquires a plurality of medium numbers corresponding to the selected parity group number from the medium number list information 1131b, and selects the plurality of media (plurality of medium numbers), then processing advances to step S105.

In step S105, the medium life check program 1137 acquires the write count corresponding to the medium number of each medium from the write count information 1133b for each medium selected in the previous step. At this time, the medium life check program 1137 acquires the medium type corresponding to the medium number of each medium from the medium type information 1133d. Also the medium life check program 1137 acquires the write count upper limit value corresponding to the acquired medium type from the write count upper limit value information 1134b for each media. And the medium life check program 1137 computes the difference between the acquired write count upper limit value and the write count for each medium selected in the previous step S105. In the present embodiment, this computed difference is called the "residual life" to simplify description, but the residual life may be computed according to a predetermined rule based on this difference. After computing the residual life, processing advances to step S106.

In step S106, the medium life check program 1137 selects a medium with the shortest residual life and a medium with the second shortest residual life out of a plurality of residual lives selected in the previous step (a plurality of residual lives corresponding to a plurality of media respectively), and computes the difference of the residual lives (residual life difference) thereof, then processing advances to step S107.

In step S107, the medium life check program 1137 checks whether the determined residual life difference is less than a first threshold value. If the residual life difference is the first threshold value or more, processing advances to step S110, and if the residual life difference is less than the first threshold value, processing advances to step S108. The first threshold value is a threshold value for preventing data from being erased from the parity group selected in S101. Specifically this is a threshold value which prevents a media having the second shortest residual life from failing due to life ending before completely replacement of the medium having the shortest residual life with a reserved medium after a failure. Therefore a value appropriate for preventing such a situation is set as the first threshold value. More specifically, it is preferable to set a value with which a second time length, which allows completion of the replacement of the failed medium 131 of which residual life is shortest with the later mentioned reserved medium, is shorter than the first time length from the failure of the medium 131 of which residual life is shortest to failure of the medium 131 of which residual life is second shortest, as the first threshold value. The first time length is variable according to the write frequency to the parity group (speed of updating write frequency). Therefore the first threshold value may be provided for each parity group, for example. For a computer program to be executed by the processor 111, a monitoring program, which is not illustrated, may be provided. In this case, the monitoring program monitors the write frequency for each parity group (or each medium), and the first threshold value corresponding to the parity group may be changed according to the value of the write frequency.

In step S108, the medium life check program 1137 refers to the media management table 1133, and selects a reserve media, with which the residual life difference becomes the first threshold value or more if it is replaced with one of the flash memory media 131 selected in step S106 and an operating medium (one of the media selected in S106). Specifically, a difference (residual life) between a write count corresponding to a parity group number which is "reserved" and the write count upper limit value corresponding to the medium type of the reserved medium (value acquired from the write count upper limit value information 1134b) is computed. And the difference between the computed residual life and the residual life of the operating media, which is not a replacement target out of the two media selected in S106 is computed, and it is judged whether the residual life difference thereof is the first threshold value or more. If the first threshold value or more, this reserved medium is selected. If there area a plurality of such media, then a reserve medium of which the difference between the residual life difference and the first threshold value is the largest or smallest is selected. The reserved medium to be selected in step S108 must have a storage capacity that is more than the storage capacity of the operating medium. This is because all the data stored in the operating medium is shifted to the reserved medium in the case of the media replacement in FIG. 12, which will be described later. Whether the storage capacity of the reserved medium is more than the storage capacity of the operating medium or not can be specified by the medium type.

Then processing advances to step S109.

In step S109, the medium life check program 1137 specifies the reserved medium selected in the previous step and the operation medium (in other words, the replacement target media, which are a replacement source medium and a replacement destination medium), and starts up the medium replacement program 1138. After this step ends, the reserved media, instead of the above mentioned replacement target media belongs to the target parity group. After this processing, processing advances to step S110.

In step S110, processing returns to step S100, and the series of processing is repeated.

Figure 12:
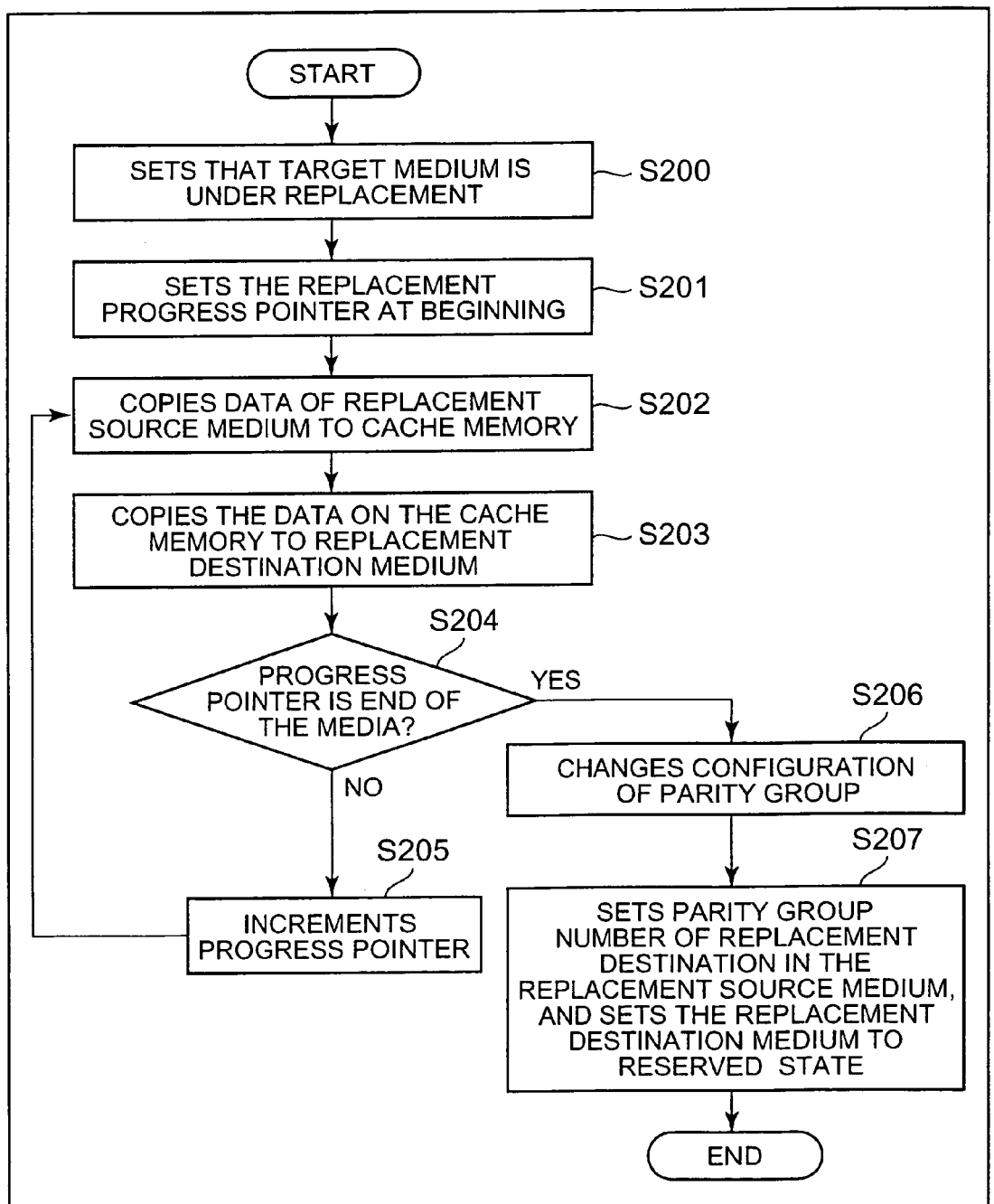
FIG. 12 is a flow chart depicting the processing procedure of the medium replacement program 1138.

FIG. 12 is a flow chart depicting the processing procedure of the media replacement program 1138.

This program is executed by the processor 111 according to an instruction from another program or according to the specification from the user. The processing procedure will now be described in detail.

After start, the medium replacement program 1138 stores information that the replacement target media is being replaced in step S200, and processing advances to step S201. Here the replacement target media refers to a replacement source medium and a replacement destination medium, and specifically to an operating medium and reserved medium specified in step S109 in FIG. 11.

In step S201, the medium replacement program 1138 sets a pointer for managing progress to the beginning (e.g. first address of each medium) to copy the replacement source medium (e.g. operating medium) to the replacement destination medium (e.g. reserved medium) sequentially from the beginning of both media, and processing advances to step S202.

In step S202, the medium replacement program 1138 reads data from the data position of the medium pointed to in the previous step, and stores this data in an appropriate cache memory slot of the cache memory area 1136. After this, processing advances to step S203.

In step S203, the medium replacement program 1138 copies the data stored in the cache memory area 1136 in the previous step to the replacement destination medium. And processing advances to step S204.

In step S204, the medium replacement program 1138 judges that copy processing ended. The end is judged by whether the progress pointer of the copy processing reached the end of the medium in the previous step. If the progress pointer did not reach the end, processing advances to step S205 to continue processing. If the progress pointer reached the end, processing advances to step S206 to execute end processing.

In step S205, the medium replacement program 1138 increments the progress pointer to change the copy target location, and processing returns to step S202 to perform copy processing of the updated location of the progress pointer.

In step S206, the medium replacement program 1138 changes the configuration of the parity group having the replacement source medium (hereafter called the "target parity group" in this description of the flow). Specifically in the medium number list information 1131b, the medium number of the replacement source medium is deleted from the medium number list corresponding to the number of the target parity group, and the medium number of the replacement destination medium is added to this media number list. After this processing, processing advances to step S207.

In step S207, the medium replacement program 1138 changes the number of the parity group corresponding to the number of the replacement destination medium to the number of the target parity group in the parity group number information 1133c, and for the replacement source medium, the value "reserved", which is information to indicate "not being used", is stored, and execution of the medium replacement program 1138 completes. If the residual life of this replacement source medium is short (e.g. less than a predetermined threshold value), a value "disabled" may be stored instead of "reserved". This value indicates that the medium cannot be selected as the replacement destination.

Figure 13:
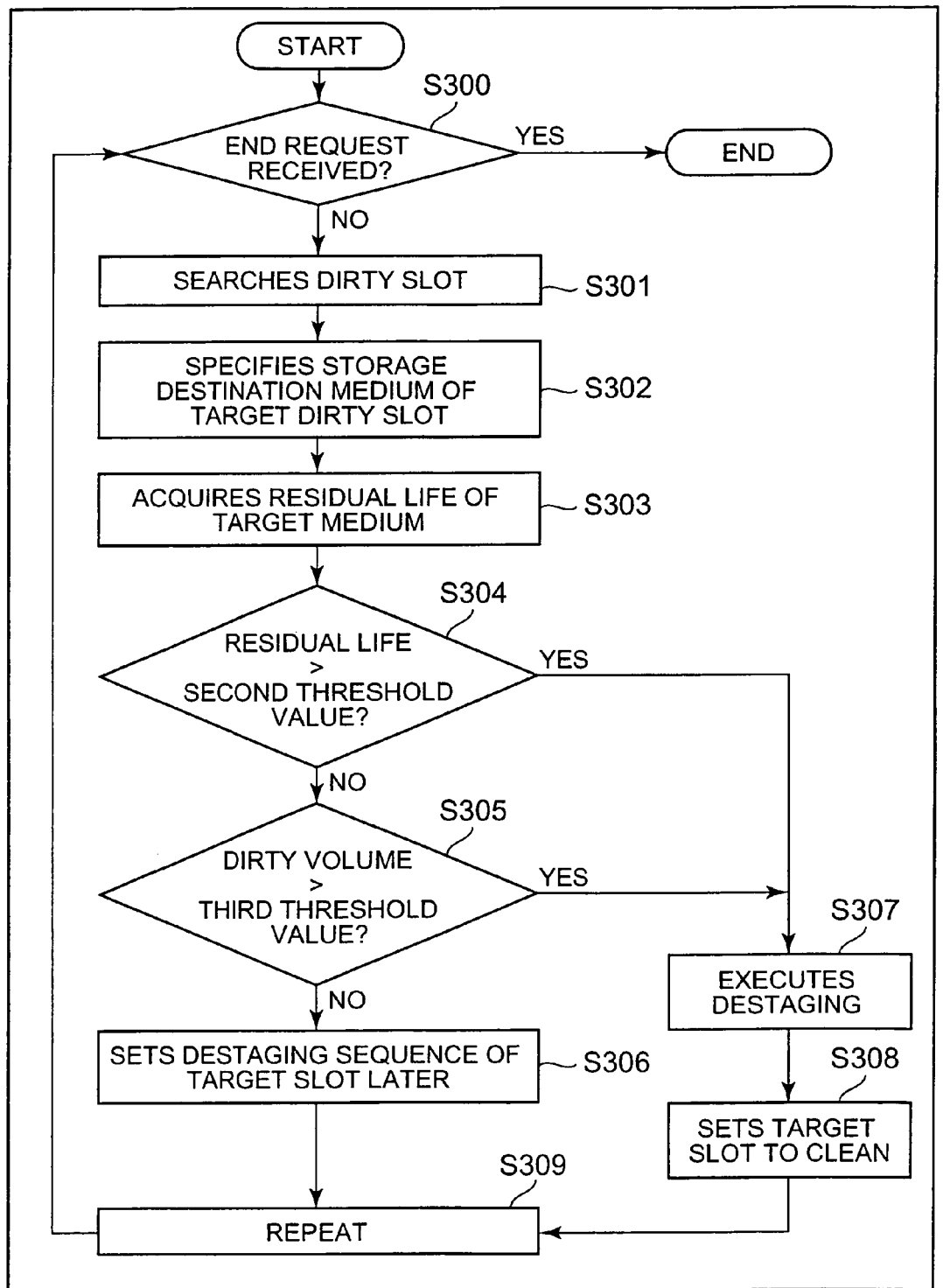
FIG. 13 is a flow chart depicting the processing procedure of the destaging control program 1139.

FIG. 13 is a flow chart depicting the processing procedure of the destaging control program 1139.

This program is executed by the processor 111 periodically, or according to an instruction from another person or according to the specification from the user. The processing procedure will now be described in detail.

After start, the destaging control program 1139 checks whether the end request was received in step S300. If the end request was received, this program ends. If the end request was not received, processing advances to step S301.

In step S301, the destaging control program 1139 specifies a member of the cache memory information table 1135-1 linked to "dirty" (that is a member linked to the dirty queue) by the first pointer information 1135-2b, then processing advances to step S302.

In step S302, the destaging control program 1139 specifies the number of the volume to which the member specified in the previous step belongs (hereafter called "target volume" in the description of this flow) using the volume number information 1135-1b. The destaging control program 1139 searches the volume number information 1132a based on the specified target volume number, and specifies the number of a parity group to which the target volume belongs (hereafter called "target parity group" in the description of this flow) using the parity group number information 1132b. The destaging control program 1139 searches the parity number information 1131a based on the specified target parity group number, and acquires the list of the media constituting the target parity group from the media number list information 1131b. Also the destaging control program 1139 acquires the RAID level corresponding to the target parity group number using the RAID level information 1131c. The destaging control program 1139 specifies a medium to be a copy destination of the dirty data (data not reflected in the medium) stored in the cache memory area 1136 by computation using the acquired RAID level and the LBA corresponding to the target volume (information acquired from the LBA information 1135-1c). After this processing, processing advances to step S303.

In step S303, the destaging control program 1139 acquires the write count corresponding to the number of the medium selected in the previous step from the write count information 1133b. At that time, the destaging control program 1139 also acquires the medium type corresponding to the medium number from the medium type information 1133d. The destaging control program 1139 then acquires the write count upper limit value corresponding to the acquired medium type from the write count upper limit value information 1134b, and computes the residual life by computing the difference between the write count upper limit value and the write count acquired above. After computing the residual life, processing advances to step S304.

In step S304, the destaging control program 1139 checks whether the determined residual life exceeds the second threshold value. In this check, if the residual life of the target medium does not exceed the threshold value, processing advances to step S307, and if it is exceeded, processing advances to step S305.

In step S305, the destaging control program 1139 counts the number of members of the cache memory information table 1135-1 linked to the dirty queue of the queue type information 1135-2a, and checks whether the dirty quantity (count value of the members) exceeds the third threshold value. In this check, if the dirty quantity exceeds the third threshold value, processing advances to step S307, and if not, processing advances to step S306.

In step S306, the destaging control program 1139 executes processing to perform processing to write the data on the cache memory area 1136 to the medium later, in order to decrease the write count to the media. Specifically, the destaging control program 1139 moves the members of the cache memory information table 1135-1, which is a data write target, linked to the dirty queue of the queue type information 1135-2a, to the end of this queue. If the member is at the beginning of the queue, the destaging control program 1139 changes the first pointer information 1135-2b to the number of the table second in the queue. After this processing, processing advances to step S309.

In step S307, the destaging control program 1139 writes the data on the cache memory area 1136 to the medium. After writing completes, the write count of the target medium is incremented, and processing advances to step S308. This write processing may be executed in erase size units referring to the erase size information 1134c on the target medium.

Since the destaging control program 1139 wrote data in the previous step, data in the cache memory area 1136 and data on the flash memory medium 131 match in step S308. Therefore the state of the cache memory is changed to "clean", and the destaging control program 1139 moves the member of the cache memory information table 1135-1 to the end of the clean queue. If the member is at the beginning of the dirty queue, the destaging control program 1139 changes the first pointer information 1135-2b corresponding to "dirty" to the number of the table existing second in the queue. If this shift processing is performed in a state where the member is not added to the clean queue, the destaging control program 1139 stores the table number of this member to the first pointer information 1135-2b corresponding to clean. After this processing, processing advances to step S309.

In step S309, processing returns to step S300 to repeat a series of processings.

Figure 14:
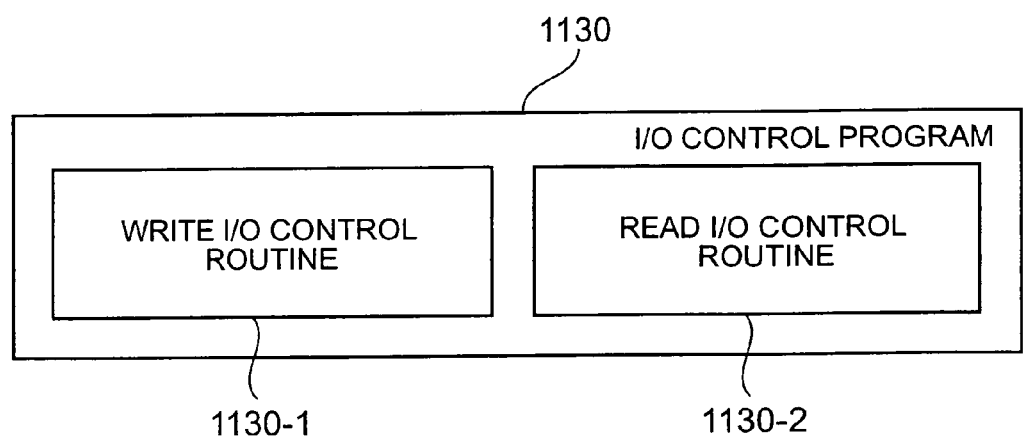
FIG. 14 is a diagram depicting a detailed structure of the I/O control program 1130.

FIG. 14 is a diagram depicting a detailed structure of the I/O control program 1130.

The I/O control program 1130 is comprised of a write I/O control routine 1130-1 for processing a write I/O (write request) requested from the host computer 300, and a read I/O control routine 1130-2 for processing a read I/O (read request).

Figure 15:
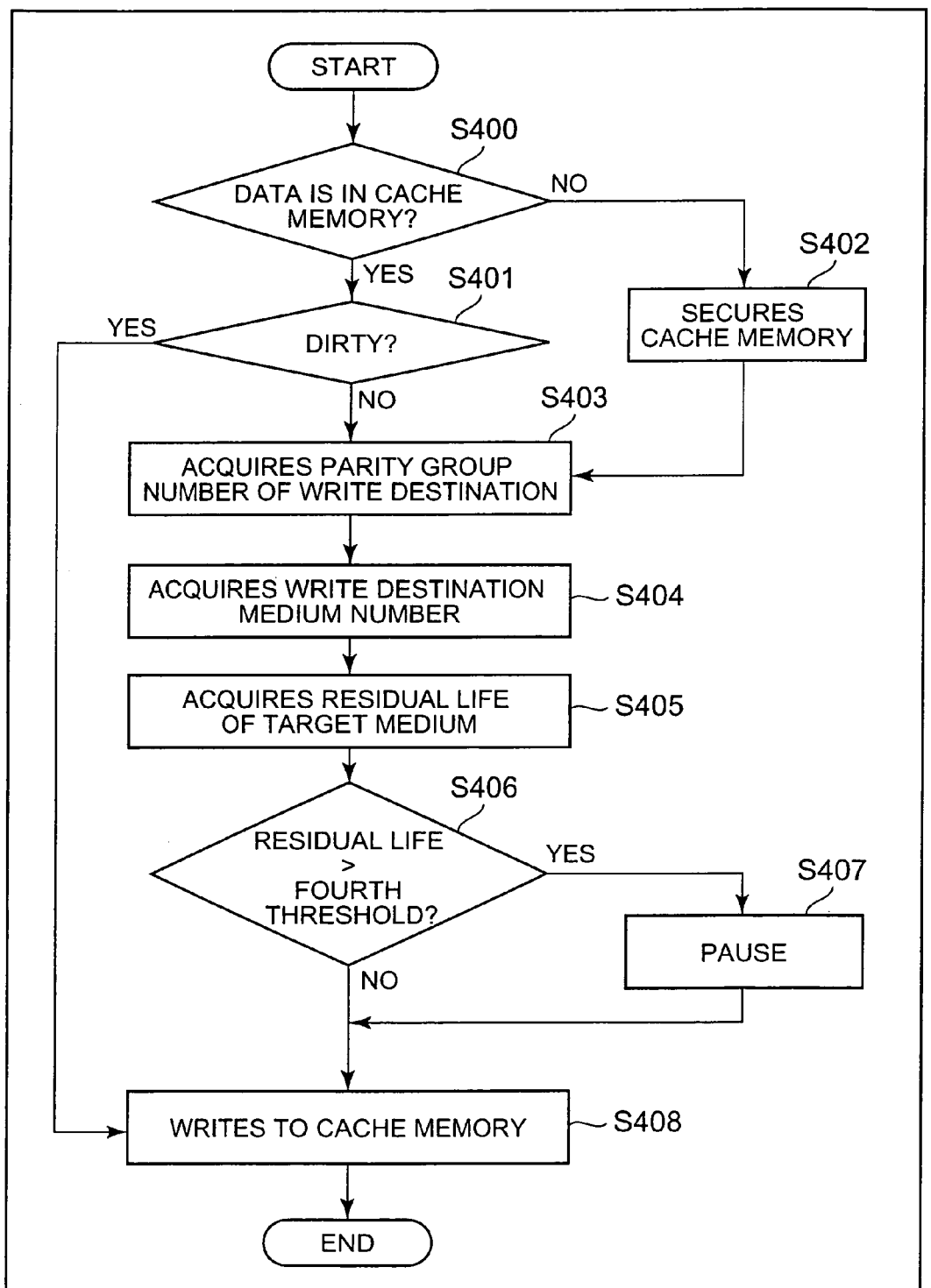
FIG. 15 is a flow chart depicting a detailed procedure of the write I/O control routine.

FIG. 15 is a flow chart depicting the detailed procedure of the write I/O control routine.

This routine is executed by the processor 111 periodically, or according to an instruction from another program, or according to specification from the user. The processing procedure will now be described in detail.

After processing starts, in step S400, the write I/O control routine 1130-1 searches the dirty queue and clean queue in the cache memory control table 1135, and checks whether an I/O target data is stored in the cache memory area 1136. As a result of checking, processing advances to step S401 if data is stored, and to step S402 if not.

In step S401, the write I/O control routine 1130-1 regards the state as a "dirty state" if the cache memory information table 1135-1 is linked to a dirty queue, and as a "clean state" if linked to a clean queue as a result of checking in the previous step. Now processing advances to step S403 if the cache memory area 1136 is in a dirty state, and to step S408 if in a clean state.

In step S402, the write I/O control routine 1130-1 secures an appropriate area on the cache memory area 1136 to be used for a data write. First an appropriate cache memory information table 1135-1 linked to a free queue is secured, and the necessary information of the volume number information 1135-1b and LBA information 1135-1c is stored. If the table is not linked to this queue in the table securing processing from a free queue, the table is secured from a clean queue. If both free queue and clean queue have no linked tables, then processing waits until the cache memory area 1136 is cleaned by the destaging control program 1139. After this processing, processing advances to step S403.

In step S403, the write I/O control routine 1130-1 specifies the parity group to which the flash memory medium 131 corresponding to the write target data storage destination belongs by referring to the parity group number information 1132*b* of the volume configuration information 1132. After this processing, processing advances to step S404.

In step S404, the write I/O control routine 1130-1 refers to the medium number list information 1131*b* of the parity group configuration information 1131, and specifies the flash memory medium 131 at the data storage destination by the address of the data write destination. After this processing, processing advances to step S405.

In step S405, the write I/O control routine 1130-1 acquires the write count and write count upper limit value for the data storage destination flash memory medium 131 by the above mentioned method, and determines the difference thereof as the residual life. After this processing, processing advances to step S406.

In step S406, the write I/O control routine 1130-1 checks whether the residual life determined in the previous step exceeds the fourth threshold value. If the fourth threshold value is exceeded, processing advances to step S407, and advances to step S408 if not. The fourth threshold value may be the same value as the second threshold value in S304 in FIG. 13, or may be a different value.

In step S407, the write I/O control routine 1130-1 pauses the I/O processing so as to limit the I/O flow. The length of this pause may be a fixed value or a variable value, which is set based on the computed residual life. (The write I/O control routine 1130-1 may determine the pause length based on the residual life, and stop the I/O processing during the determined pause length.) During the pause of I/O processing, processing for delaying an I/O from the host, for example, may be executed. Specifically, an I/O from the host may be delayed by returning a retry request or busy to the host as a response to the I/O from the host, or the response to the I/O may be delayed by storing the request message of the received I/O in a predetermined buffer. After this processing, processing advances to step S408.

In step S408, a difference is generated between the data in this cache memory area 1136 and the data stored in the corresponding flash memory medium 131. Therefore the state of the cache memory slot where this data is stored must be set to "dirty". For this, the write I/O control routine 1130-1 shifts the member of the target cache memory information table 1135-1 to a dirty queue. Then the write I/O control routine 1130-1 transfer the write target data requested from the host computer 300 to the area on the secured cache memory area 1136. A series of processing ends with the above processings. At this time, the value of the write count related to this write target flash memory medium 131 is incremented. Deterioration of the flash memory medium 131 is generated in erase processing, which is generated once every several write processings, so the write count may be incremented after writing of the size of the data specified in the erase size information 1134*c*.

Figure 16:
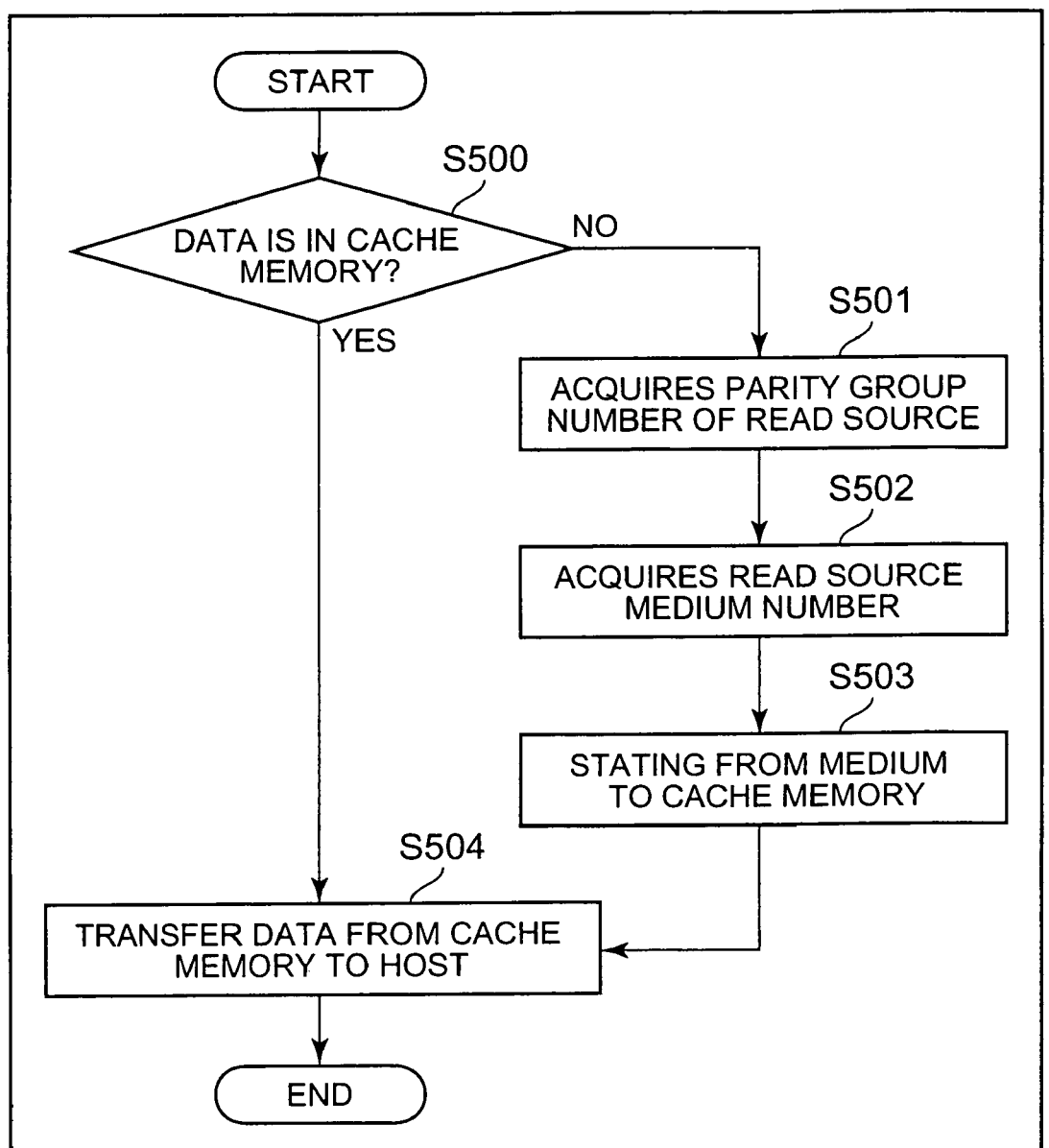
FIG. 16 is a flow chart depicting a detailed procedure of the read I/O control routine.

FIG. 16 is a flow chart depicting the detailed procedure of the read I/O control routine.

This routine is executed by the processor 111 periodically, or according to an instruction from another program, or according to specification from the user. The processing procedure will now be described in detail.

After processing starts, in step S500, the read I/O routine 1130-2 searches the dirty queue and clean queue in the cache memory control table 1135, and checks whether I/O target data is stored in the cache memory area 1136. As a result of checking, processing advances to step S501 if data is not stored, and to step S504 if stored.

In step S501, the read I/O control routine 1130-2 specifies a parity group to which the flash memory medium 131 corresponding to the read data storage destination by referring to the parity group number information 1132*b* of the volume configuration information 1132. After this processing, processing advances to step S502.

In step S502, the read I/O control routine 1130-2 refers to the medium number list information 1131*b* of the parity group configuration information 1131, and specifies the flash memory medium 131 of the data storage destination by the address of the data read source. After this processing, processing advances to step S503.

In step S503, the read I/O control routine 1130-2 stores data to be transferred to the host computer 300 to an appropriate cache memory slot on the cache memory area 1136. First an appropriate cache memory information table 1135-1 linked to a free queue is secured, and necessary information of the volume number information 1135-1*b* and LBA information 1135-1*c* is stored. If the table is not linked to this queue in the table secure processing from the free queue, the table is secured from the clean queue. If both the free queue and clean queue do not have linked tables, then processing waits until the cache memory area 1136 is cleaned by the destaging control program 1139. After this processing, the target data on the flash memory medium 131 is copied to the cache memory area 1136. After copying, the secured members of the cache memory information table 1135-1 are moved to the clean queue. After this processing, processing advances to step S504.

In step S504, the read I/O control routine 1130-2 sends the data stored in the area on the cache memory area 1136 detected or secured in the previous step to the host computer 300, and ends the series of processings.

Figure 17:
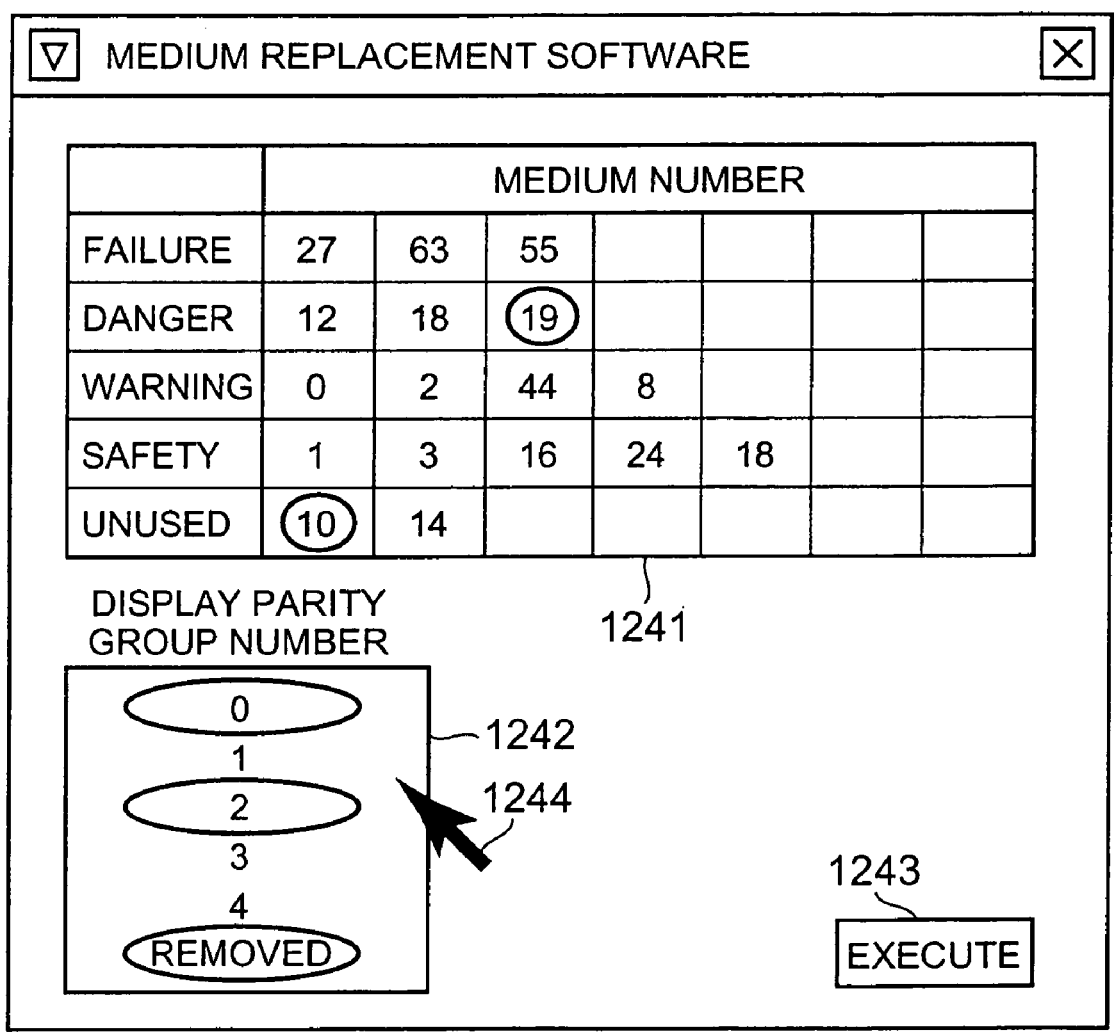
FIG. 17 is a diagram depicting details of the display screen of the user interface 124.

FIG. 17 is a diagram depicting the details of the display screen of the user interface 124.

On the display screen (graphical user interface), a medium select sheet 1241, parity group select sheet 1242 and execute button 1243, for example, are displayed. This display screen is displayed by the medium replacement program 1138, for example.

In the parity group select sheet 1242, the number of the parity group is displayed. The medium replacement program 1138 displays parity group numbers out of which an arbitrary number of numbers can be selected (for example, a parity group number can be selected using the mouse cursor 1244). According to the select processing, the display of the medium select sheet 1241 is changed.

In the medium select sheet 1241, the numbers of the flash memory media 131 constituting the parity group selected in the parity group select sheet 1242 are displayed. In the medium select sheet 1241, two numbers being displayed can be selected using the mouse cursor 1244, for example.

The execute button 1243 requests the controller 110 to replace the two flash memory media 131 selected in the medium select sheet 1241 according to the selection by the mouse cursor 1244. According to this request, the controller 110 performs the processing of the medium replacement program 1138 by the processing 111 to execute replacement processing.

According to the above mentioned first embodiment, the difference between the shortest residual life and the second shortest residual life is controlled to be the first threshold value or more in a parity group. By this, the occurrence of failure of two or more storage media in the same period of time in a parity group can be prevented.

Embodiment 2

The second embodiment of the present invention will now be described. In the following description, primarily the differences from the first embodiment will be described, and description of common aspects as the first embodiment will be omitted or simplified.

Figure 18:
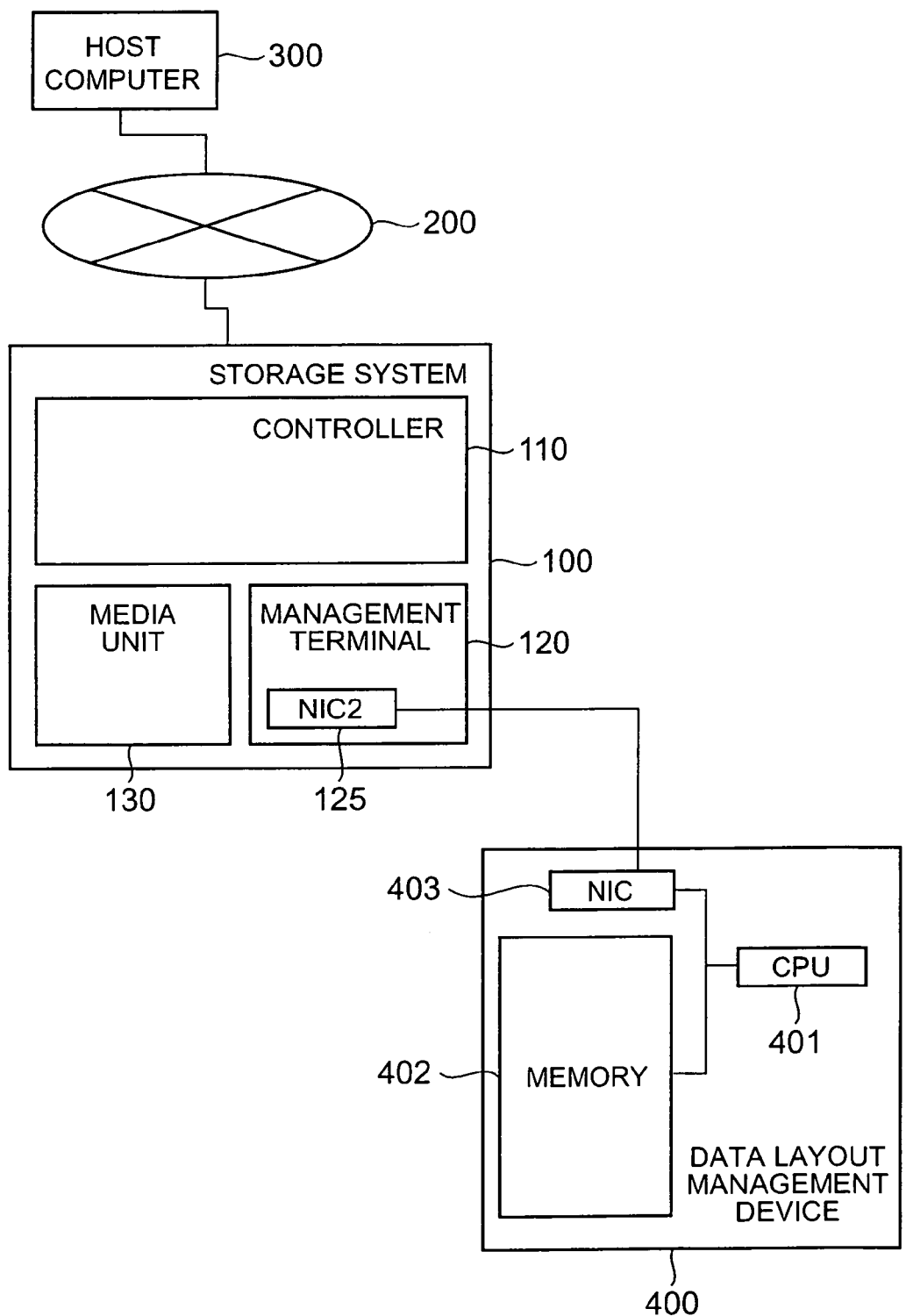
FIG. 18 is a diagram depicting a configuration of the computer system according to the second embodiment of the present invention.

FIG. 18 is a diagram depicting the configuration of the computer system according to the second embodiment of the present invention.

First the configuration of the system will be described.

The host computer 300, storage network 200, storage system 100 and the components of the storage system 100, which are the controller 110, media unit 130, management terminal 120 and the network interface 125, which is a component of the management terminal 120, are the same as those described in the first embodiment (FIG. 1). The controller 110 additionally has a "volume migration function". By this function, a logical volume in use and an unused logical volume are specified, and after data is copied from the logical volume in use to the unused logical volume, the logical volume numbers thereof are replaced, so as to replace the parity groups to which these logical volumes belong.

In the second embodiment, the data layout management device 400 is connected to the management terminal 120. The data layout management device 400 has a function to change the medium type for storing data according to the intended use of the volume which the device is managing. The data layout management device 400 is comprised of a processor 401 for controlling the entire device, a memory 402 for storing programs and control information for the processor 401 to control, and a network interface 403 which is a communication interface with the management terminal 120. The network interface 403 is connected to the network interface 122.

As an example of each component of the data layout management device 400, the following equipment can be used. In other words, the processor 401 mainly uses a personal or server user processor, such as an x86, SPARC or Power. The memory 402 is a volatile memory, such as SRAM and SDRAM, or a non-volatile memory, such as a flash memory. The network interface 403 is a communication interface, such as an Ethernet card.

Figure 19:
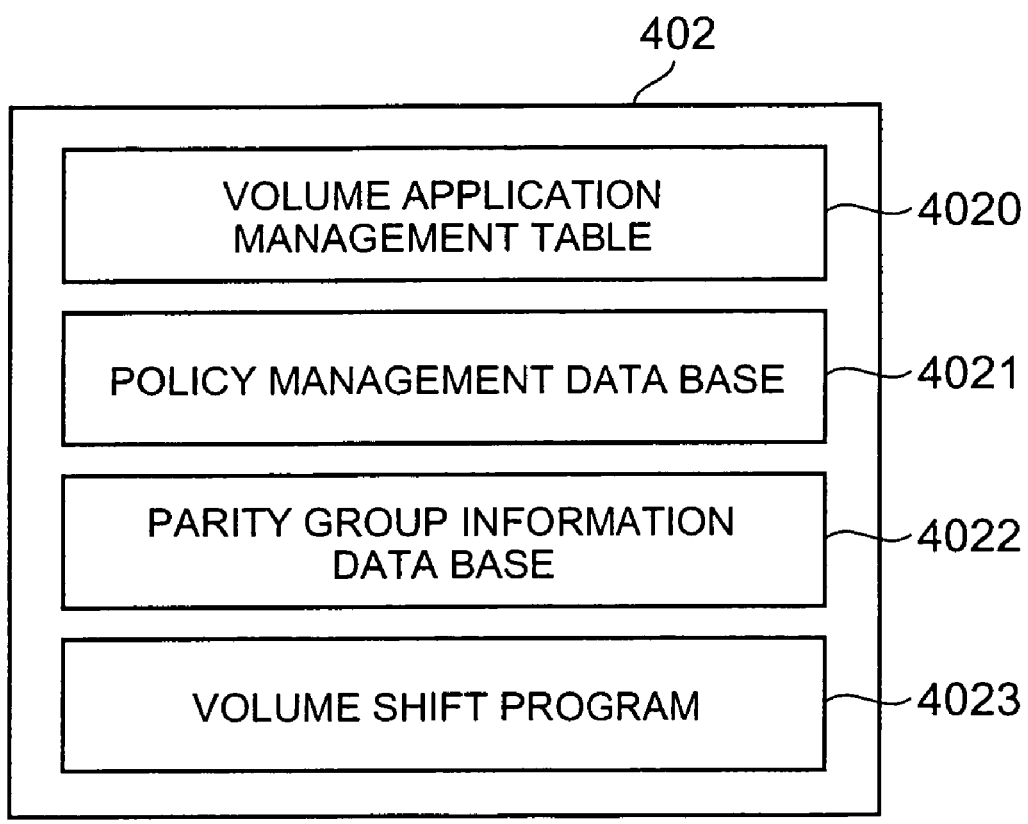
FIG. 19 is a diagram depicting the detailed configuration of the programs and control information to be stored in the memory 402.

FIG. 19 is a diagram depicting a detailed configuration of the programs and control information stored in the memory 402.

In the memory 402, a volume application management table 4020 for managing the application of each volume, a policy management data base 4021 for storing performance and life information required according to the application of the volume, and a parity group information data base 4022 for storing access performance values and residual life information of each parity group, for example, are stored.

In the memory 402, a volume shift program 4023, for example, is stored as a program to be executed by the processor 401. The volume shift program 4023 proposes (e.g. notifies the user) a shift of an arbitrary volume to another appropriate parity group according to the application of this volume, and requests execution to the controller 110.

Figure 20:
FIG. 20 is a table showing a detailed configuration of the volume application management table 4020.

FIG. 20 is a table showing a detailed configuration of the volume application management table 4020.

The volume application management table 4020 has the volume number information 4020a, parity group number information 4020b, volume application information 4020c and volume capacity information 4020d as composing elements. In the volume number information 4020a, a volume number of each volume is included. In the parity group number information 4020b, a number of a parity group to which the volume belongs is included for each volume. In the volume application information 4020c, information to indicate the application of the volume (hereafter called "volume application") is included for each volume. In the volume capacity information 4020d, the storage capacity of the volume is included for each volume.

Using the volume application in the volume application information 4020c, the required performance and required write frequency corresponding to the volume application can be acquired from the later mentioned policy management data base 4021 in FIG. 21.

Also using the parity group number in the parity group number information 4020b, various information corresponding to the parity group number can be acquired from the later mentioned parity group information data base 4022 in FIG. 22.

In the above example, one data layout management device 400 manages one storage system 100. But the present invention is not limited to this, and other kinds of configuration may be used. For example, if one data layout management device 400 manages a plurality of storage systems 100, then information for specifying the storage system 100, such as product number, is required in addition to other information.

The correspondence of the volume number information 4020a, parity group number information 4020b and volume capacity information 4020d can be acquired via the management terminal 120 by requesting the controller 110 to transfer information of the volume configuration information 1132.

FIG. 21 is a table showing a detailed configuration of the policy management data base 4021.

The policy management data base 4021 is comprised of a volume application information 4021a, volume required performance information 4021b and volume write frequency information 4021c as composing elements. In the volume application information 4021a, each volume application is included. In the volume required performance information 4021b, a performance value required for the volume application (hereafter called "required performance") is included for each volume application. In the volume write frequency information 4021c, the frequency of writing generated in the volume application is included for each volume application.

The table index stored in the volume application information 4021a is referred to by the volume application information 4020c shown in FIG. 20.

FIG. 22 is a table showing a detailed configuration of the parity group information data base 4022.

The parity group information data base 4022 is comprised of parity group number information 4022a, capacity list information 4022b, maximum performance value information 4022c and residual life information 4022d as composing elements. In the parity group number information 4022a, the number of each parity group is included. In the capacity list information 4022b, a list of the storage capacity of each logical volume created in the parity group is included for each parity group. In the maximum performance value information 4022c, the maximum value of the performance which the parity group can exhibit (e.g. such performance information as latency and throughput) is included for each parity group. In the residual life information 4022d, the writable count for the parity group is included for each parity group.

The maximum performance value information 4022c can be determined by requesting the controller 110 to transfer information of the parity group configuration information 1131, media management table 1133 and media information data base 1134 via the management terminal 120, for example, acquiring the requested information, and computing the sum of the transferred performance (value acquired from the medium performance value 1134) of each medium 131 constituting the target parity group. The maximum performance value, however, may be determined based on the result of actual performance measurement, instead of the above computation.

The capacity list information 4022b can be acquired by requesting the controller 110 to transfer the information of the parity group configuration information 1131 via the management terminal 120.

The residual life information 4022d can be determined by requesting the controller 110 to transfer the information of the parity group configuration information 1131 and the media management table 1133 via the management terminal 120, acquiring the information, then computing the residual life, which is the difference between the write count upper limit value and the write count, for each flash memory medium 131 constituting the target parity group, and computing the sum of the plurality of computed residual lives. In FIG. 22, "infinite" in the writable count means that the storage medium is not the kind which simply deteriorates by writing (e.g. HDD).

Figure 23:
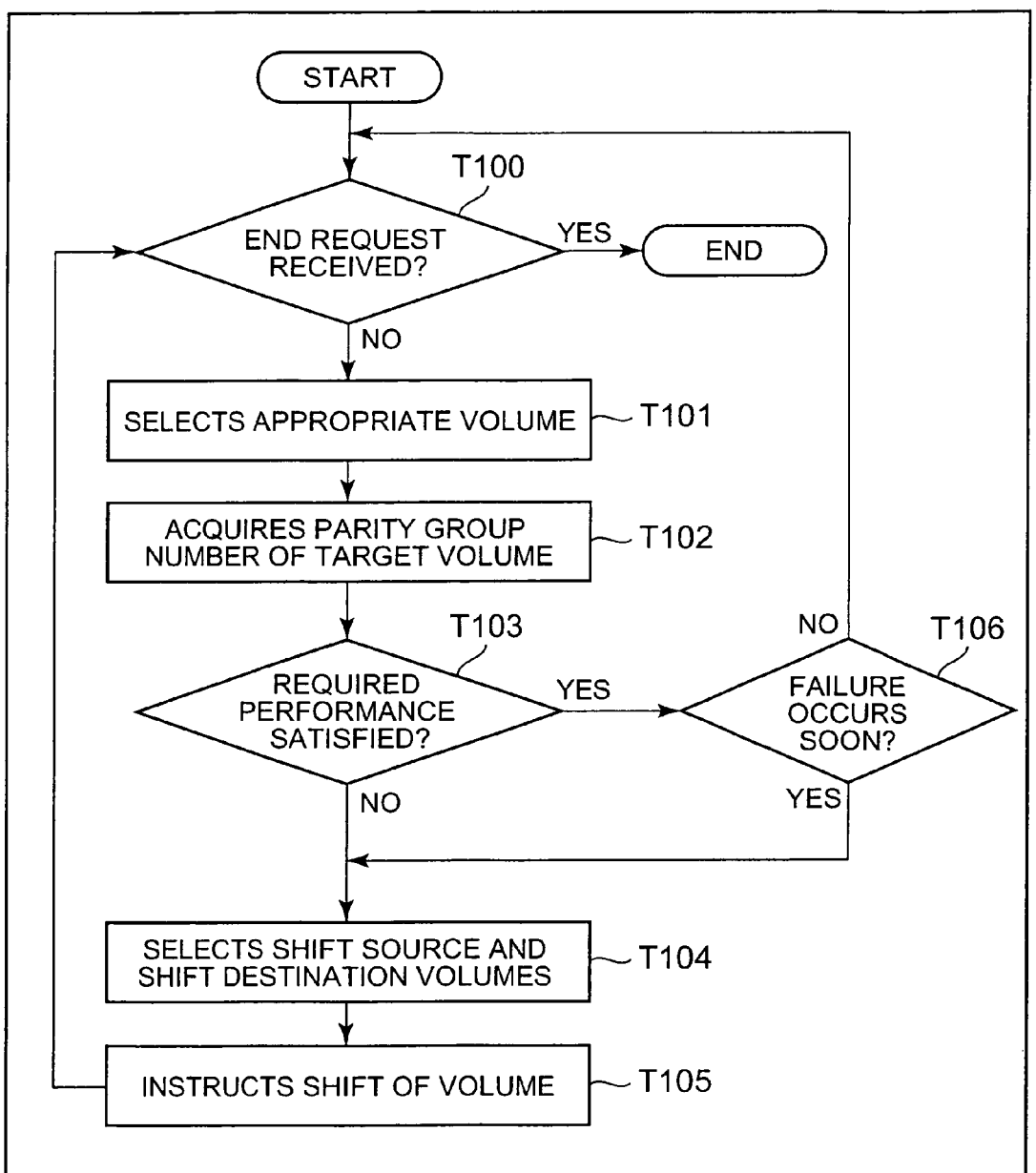
FIG. 23 is a flow chart depicting the detailed procedure of the volume shift program 4023.

FIG. 23 is a flow chart depicting the detailed procedure of the volume shift program 4023.

This program is executed by the processor 401 periodically, or according to an instruction from another program, or according to specification from the user. The processing procedure will now be described in detail.

After processing starts, the volume shift program 4023 checks whether end request was received in step T100. If end request was received, this program ends. If end request was not received, processing advances to step T101.

In step T101, the volume shift program 4023 selects an appropriate volume managed by the data layout management device 400. This selection method may be any method of specifying a volume at random, selecting a volume which was not checked in the past with priority, or selecting a volume, of which setting changed, with priority. After this processing, processing advances to step T102.

In step T102, the volume shift program 4023 specifies a parity group to which the volume selected in the previous step belongs. The parity group is specified by searching the volume selected in the previous step in the volume number information 4020a of the volume application management table 4020, and acquiring the parity group having this volume from the parity group information data base 4022. After this processing, processing advances to step T102.

The volume shift program 4023 judges whether the operation of the target volume is continued with the parity group specified in the previous step. In this case, the judgment is performed by the first judgment standard of "whether the required performance is satisfied", as shown in step T103, and the second judgment standard of "whether failure will occur soon if operation continues", as shown in step T106.

In step T103, the volume shift program 4023 extracts the volume belonging to this parity group (parity group specified in step T102) by searching the parity group number information 4020b of the volume application management table 4020, so as to judge "whether required performance is satisfied". And the volume shift program 4023 acquires the volume required performance information 4021b from the policy management data base 4021, which is referred to by the volume application information 4020c on the extracted volume. Then the volume shift program 4023 acquires the performance value of this parity group from the maximum performance value information 4022c. And the sum of the required performance value of each volume belonging to this parity group and the performance value of the parity group are compared. It is judged as "satisfied" if the former is smaller than the latter, and processing advances to step T106, and judged as "not satisfied" if the former is greater than the latter, and processing advances to step T104. In step T103, it is judged whether the required performance is satisfied, but whether the volume application of each volume constituting the parity group is appropriate or not may be judged based on at least one of reliability (e.g. RAID level), medium price and medium type, instead of or in addition to this judgment.

In step T106, the volume shift program 4023 extracts the volume belonging to this parity group by searching the parity group number information 4020b of the volume application management table 4020, so as to judge "whether failure will occur soon if operation continues". And the volume write frequency information 4021c is acquired from the policy management data base 4021 which is referred to by the volume application information 4020c on the extracted volume. Then the residual life of the parity group is acquired from the residual life information 4022d. And this residual life of the parity group is divided by the sum of the life consumption speed of each volume belonging to the parity group (sum of required write frequency), and the time when the failure may occur is estimated by the quotient thereof. If this estimated value (e.g. quotient) is within the fifth threshold value, it is judged that "failure will occur soon", and processing advances to step T104, and if the estimated value exceeds the threshold value, it is judged that "it takes a long time until failure occurs", and processing advances to step T100.

In step T104, the volume shift program 4023 selects an appropriate volume for the shift source and the shift destination respectively. The purpose of this selection is that the required performance is "satisfied" in the judgment of "whether required performance is satisfied" and that "it takes a long time until failure occurs" in the judgment of "whether failure will occur soon if operation continues" in this parity group as a result of shifting the volume, as mentioned later. Therefore based on this point of view, volumes appropriate for the shift source and shift destination are selected respectively. Specifically, if the required performance is not satisfied, for example, a volume corresponding to the volume application with the required performance, which is more than the difference between the sum of the required performance of the plurality of volumes in this parity group and the maximum performance of this parity group, is selected as the shift source volume. If a failure may occur soon, a volume corresponding to the volume application, with which the requested write frequency can make the sum of the required write frequency to be residual life>fifth threshold value, is selected as the shift source volume. The storage capacity of the shift destination value must be more than the storage capacity of the shift source volume. If a shift destination that can achieve the above object cannot be found, a shift destination volume, with which performance is closer to the required performance value or the time until a failure may occur is longer than the current configuration, may be specified if it exists.

In step T105, the volume shift program 4023 specifies the shift source and shift destination volumes, and has the controller 110 execute the shift of the volumes via the management terminal 120. After this processing, processing returns to step T100, and the series of processings is repeated.

According to the second embodiment, if a volume with a volume application of which write frequency is high exists in the parity group comprised of media having low residual lives, the volume can be shifted to another parity group, so that the period when a failure may occur to the priority group can be delayed.

Preferred embodiments of the present invention were described above, but these are examples to describe the present invention, and are not intended to limit the scope of the present invention, only the embodiments are limited. The present invention can be embodied by various other forms.

For example, in the second embodiment, the computer programs and control information to be executed in the data layout management device 400 may be in a memory in the storage system (in other words, the flow in FIG. 23 may be executed in the storage system). Also the flow in FIG. 11, for example, may be executed in a remote computer connected to the storage system, instead of being executed the storage system itself.

Also in the second embodiment, for example, the following processings may be performed. The volume shift program 4023 shifts a volume in application where write is generated or write is generated relatively frequently (e.g. backup or operation, hereafter called a "write application") from the parity group of which residual life is short (e.g. less than the predetermined threshold value) (hereafter called "parity group A") to the outside. And the volume shift program 4023 shifts a volume in application where write is not generated or not generated relatively frequently (e.g. archive or WORM, hereafter called "read application") to the parity group A. In other words, the volume in write application and the volume in read application are replaced. This means that the volume shift program 4023 sets the parity group A of which residual life is short to substantially read only. By this, the parity group A of which residual life is short can be used for a long time. A parity group of which volume in read application is selected to be a replacement target can be a parity group of which residual life is longest, for example. In the above volume replacement, the volume in read application is shifted to the parity group A of which residual life is short, so further writing is generated in the parity group A of which residual life is short during this shift. So the volume shift program 4023 is constructed so that the residual life will not run out by this writing. Specifically, the volume shift program 4023 selects a volume in read application which has a size of which write count based on the size of the volume in the read application is smaller than the residual life of writing, and of which capacity does not exceed the capacity of the shift destination parity, and sets this volume as the replacement target volume in read application.

What is claimed is:

1. The storage system, comprising:
a control section for processing a read/write request from an external device outside the storage system;
a plurality of storage media for storing data to be used by said external device;
group management information that indicates the correspondence between each of said plurality of storage media and each of a plurality of storage media groups formed of a plurality of storage media;
storage media management information for managing a consumption value related to writing for each of said plurality of storage media; and
upper limit write management information for managing information that indicates an upper limit related to writing of each of said plurality of storage media, wherein
said control section updates a consumption value in said storage media management information corresponding to a storage medium of a write destination according to writing to a storage medium,
selects a storage media group out of said plurality of storage media groups,
specifies a plurality of storage media constituting said selected storage media group out of said group management information,
acquires a consumption value from said storage media management information for each of said specified plurality of storage media,
acquires an upper limit related to writing from said storage media management information for each of said specified plurality of storage media, and
computes a remaining use period value, which indicates how much longer the storage medium can be used, using said acquired consumption value and said acquired upper limit for each of said specified plurality of storage media, and
shifts data in at least one storage medium out of the plurality of storage media belonging to said selected storage area group to a storage medium which is different from said storage area group, based on each of said computed remaining use period values,
wherein said storage system further comprises one or more reserved storage media which do not belong to any of said plurality of storage media groups, and
said control section computes a difference of the remaining use period values of two storage media out of said specified plurality of storage media, compares said difference with a first threshold value, and shifts data in a first storage medium out of the first and second storage media corresponding to said two storage media respectively to one reserved storage medium out of said one or more reserved storage media if said difference is less than said first threshold value,
wherein said control section changes said first threshold value according to the write frequency to the storage media group and/or each storage medium.

2. The storage system according to claim 1, wherein said two storage media are a storage medium of which remaining use period value is shortest and a storage medium of which remaining use period value is second shortest.

3. The storage system according to claim 1, wherein said first threshold value is a value which makes a second time length from failure of a storage medium of which remaining use period value is shorter out of said two storage media up to completion of data shift to said reserved storage medium to be shorter than a first time length up to failure of the storage medium of which remaining use period value is longer.

4. The storage system according to claim 1, wherein said storage media management information includes the consumption value of each of said reserved storage media, and
said control section computes the remaining use period value of each of said reserved storage media using the consumption value and the upper limit of each of said reserved storage medium, and shifts data in said first storage medium to a reserved medium having a remaining use period value of which difference from the remaining use period value of said second storage medium is said first threshold value or more.

5. The storage system according to claim 1, wherein said two storage media are storage media of which remaining use period values are close to each other.

6. The storage system comprising:
a control section for processing a read/write request from an external device outside the storage system;
a plurality of storage media for storing data to be used by said external device;
group management information that indicates the correspondence between each of said plurality of storage media and each of a plurality of storage media groups formed of a plurality of storage media;

storage media management information for managing a consumption value related to writing for each of said plurality of storage media; and upper limit write management information for managing information that indicates an upper limit related to writing of each of said plurality of storage media, wherein said control section updates a consumption value in said storage media management information corresponding to a storage medium of a write destination according to writing to a storage medium, selects a storage media group out of said plurality of storage media groups, specifies a plurality of storage media constituting said selected storage media group out of said group management information, acquires a consumption value from said storage media management information for each of said specified plurality of storage media, acquires an upper limit related to writing from said storage media management information for each of said specified plurality of storage media, and computes a remaining use period value, which indicates how much longer the storage medium can be used, using said acquired consumption value and said acquired upper limit for each of said specified plurality of storage media, and shifts data in at least one storage medium out of the plurality of storage media belonging to said selected storage area group to a storage medium which is different from said storage area group, based on each of said computed remaining use period values, further comprising a cache memory area for temporarily storing write target data from an external device, wherein said control section stores a plurality of write target data which are stored in said cache memory area and which do not match data in each of said storage media into storage media in a predetermined sequence respectively, compares said computed remaining use period value and a second threshold value for a write destination storage medium of a certain write target data out of said plurality of write target data, and moves a sequence of said certain write target to be later than said sequence if said remaining use period value is less than said second threshold value.

7. The storage system according to claim 6, wherein said control section compares a total volume of said plurality of write target data and a third threshold value, and moves the sequence of said write target data to be later than said sequence if said remaining use period value is less than said second threshold value and said total volume is less than said third threshold value.

8. The storage system, comprising:
a control section for processing a read/write request from an external device outside the storage system;
a plurality of storage media for storing data to be used by said external device;
group management information that indicates the correspondence between each of said plurality of storage media and each of a plurality of storage media groups formed of a plurality of storage media;
storage media management information for managing a consumption value related to writing for each of said plurality of storage media; and upper limit write management information for managing information that indicates an upper limit related to writing of each of said plurality of storage media, wherein said control section updates a consumption value in said storage media management information corresponding to a storage medium of a write destination according to writing to a storage medium, selects a storage media group out of said plurality of storage media groups, specifies a plurality of storage media constituting said selected storage media group out of said group management information, acquires a consumption value from said storage media management information for each of said specified plurality of storage media, acquires an upper limit related to writing from said storage media management information for each of said specified plurality of storage media, and computes a remaining use period value, which indicates how much longer the storage medium can be used, using said acquired consumption value and said acquired upper limit for each of said specified plurality of storage media, and shifts data in at least one storage medium out of the plurality of storage media belonging to said selected storage area group to a storage medium which is different from said storage area group, based on each of said computed remaining use period values, wherein said consumption value is at least one of a write count, erase count and defective area size, said group management information includes a RAID configuration of each storage media group, said storage system further comprises one or more reserved storage media which do not belong to any of said plurality of storage media groups, and said control section specifies said RAID configuration of said selected storage media group from said group management information and selects said two or more storage media from said plurality of storage media constituting said storage media group based on said specified RAID configuration, computes a difference between two remaining use period values of the shortest remaining use period value and the second shortest remaining use period value out of two or more remaining use period values corresponding to said two or more storage media respectively, compares said difference and said first threshold value, and shifts data in a first storage medium out of the first and second storage media which correspond to said two remaining use period values respectively to one reserved storage medium out of said one or more reserved storage media if said difference is less than said first threshold value, and said first threshold value is a value which makes a second time length from failure of the storage medium of which remaining use period value is shorter out of said two storage media up to the completion of data shift to said reserved storage medium to be shorter than a first time length up to failure of the storage medium of which remaining use period value is longer.

* * * * *